March 17, 1964  A. L. M. A. ROUY  3,125,647
ELECTRO-ACOUSTIC TRANSDUCER
Filed March 31, 1960  9 Sheets-Sheet 1
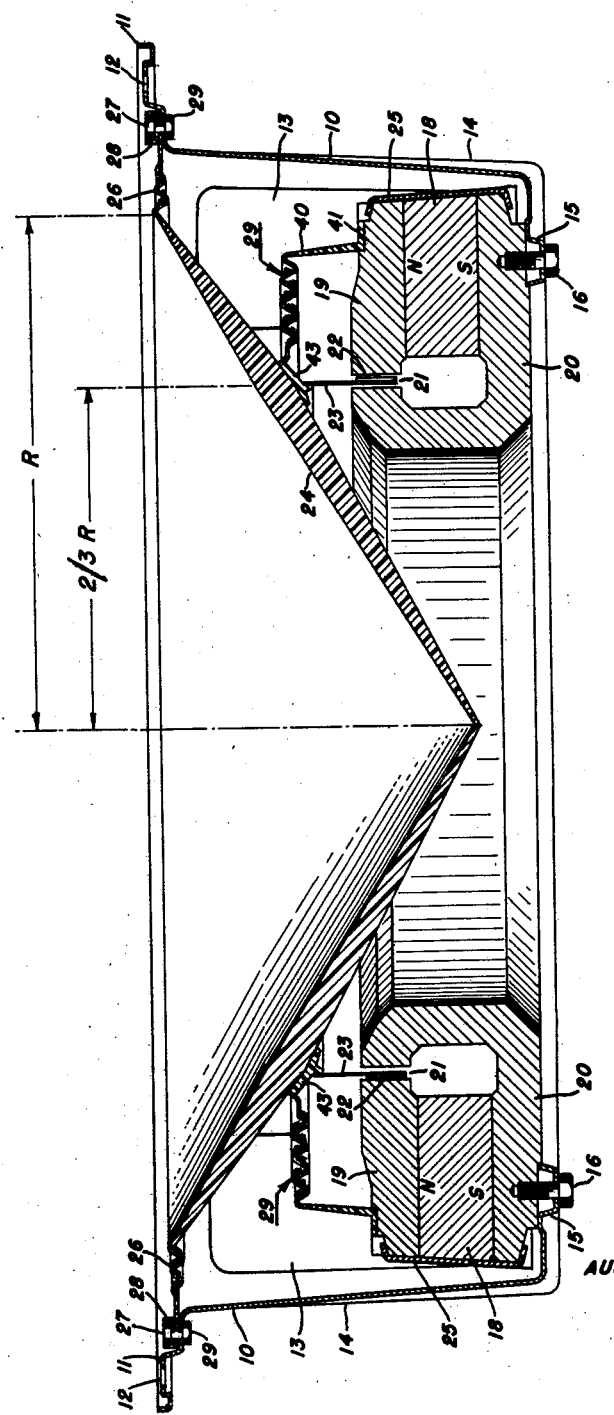
AUGUSTE LOUIS MARIE ANTOINE ROUY
INVENTOR.
BY
Rudolph L. Junick
ATTORNEY

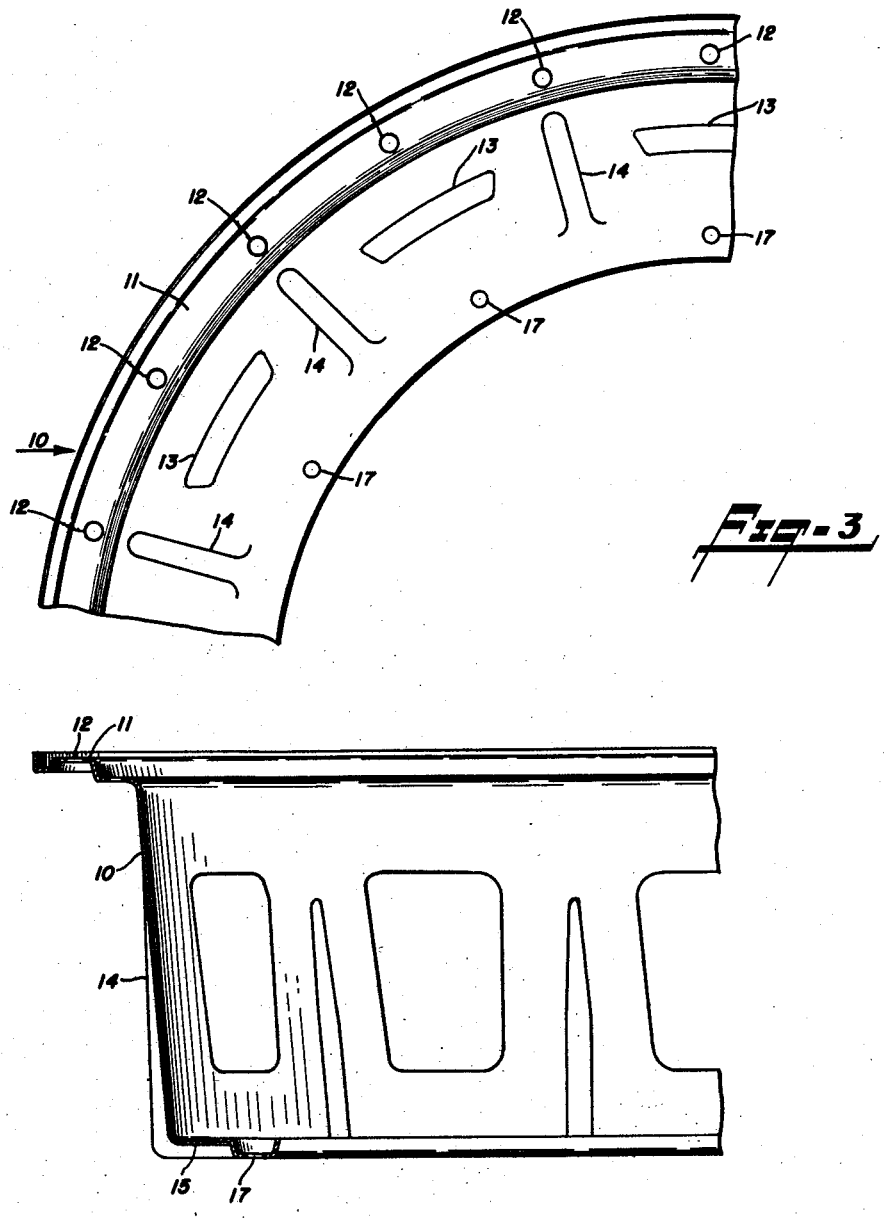

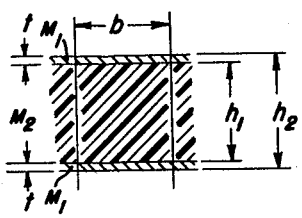
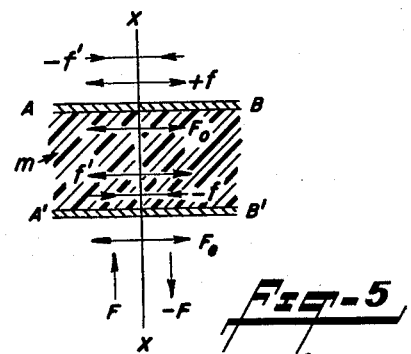
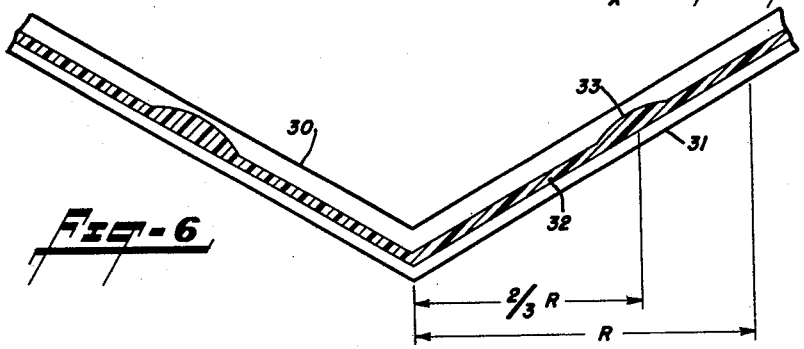
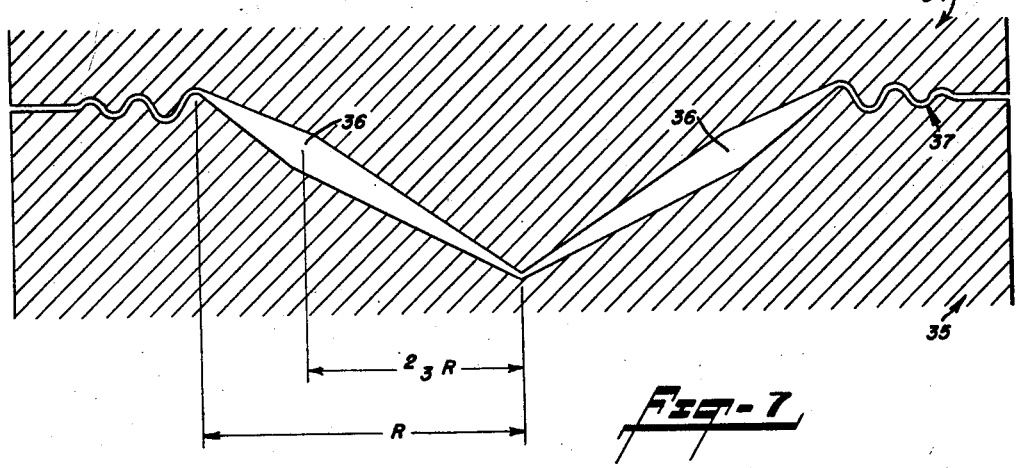

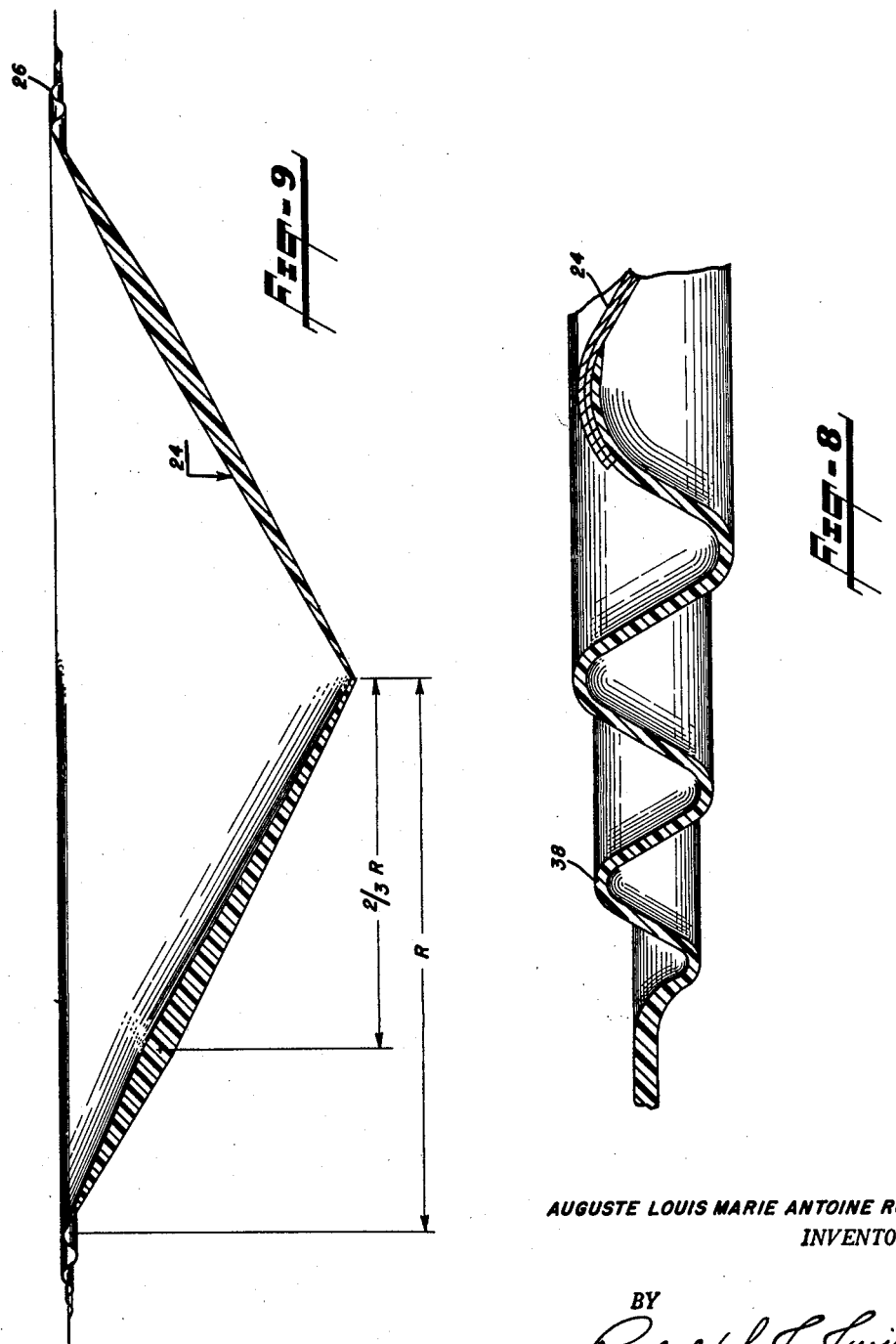

AUGUSTE LOUIS MARIE ANTOINE ROUY
INVENTOR.

BY
*Rudolph J. Juick*
ATTORNEY

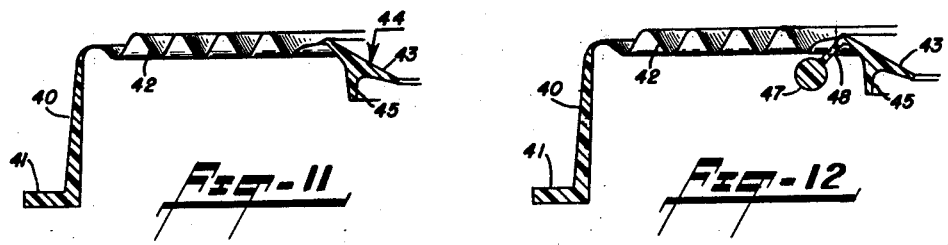
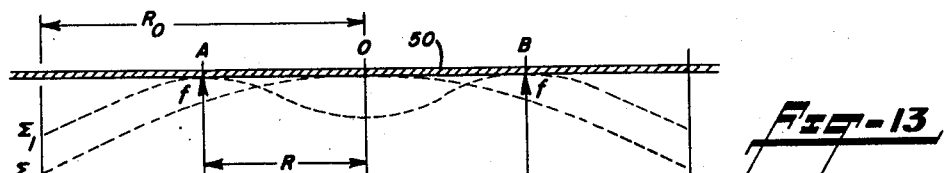
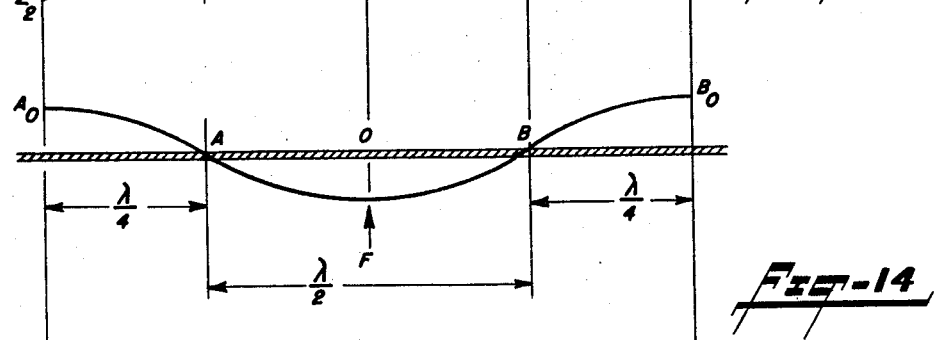
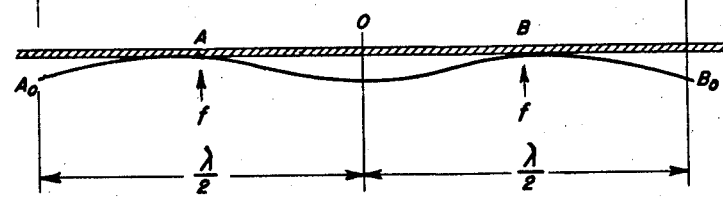

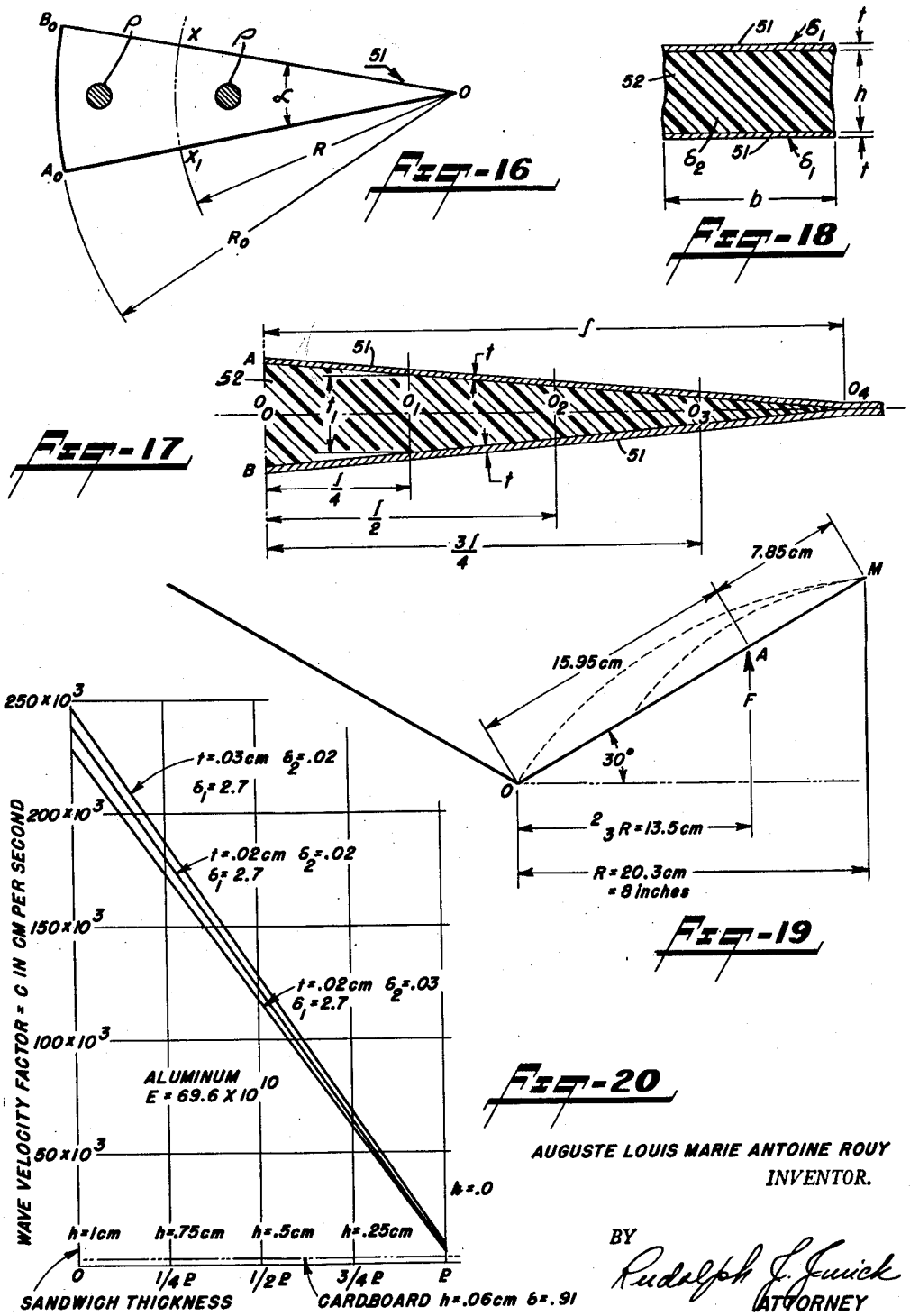

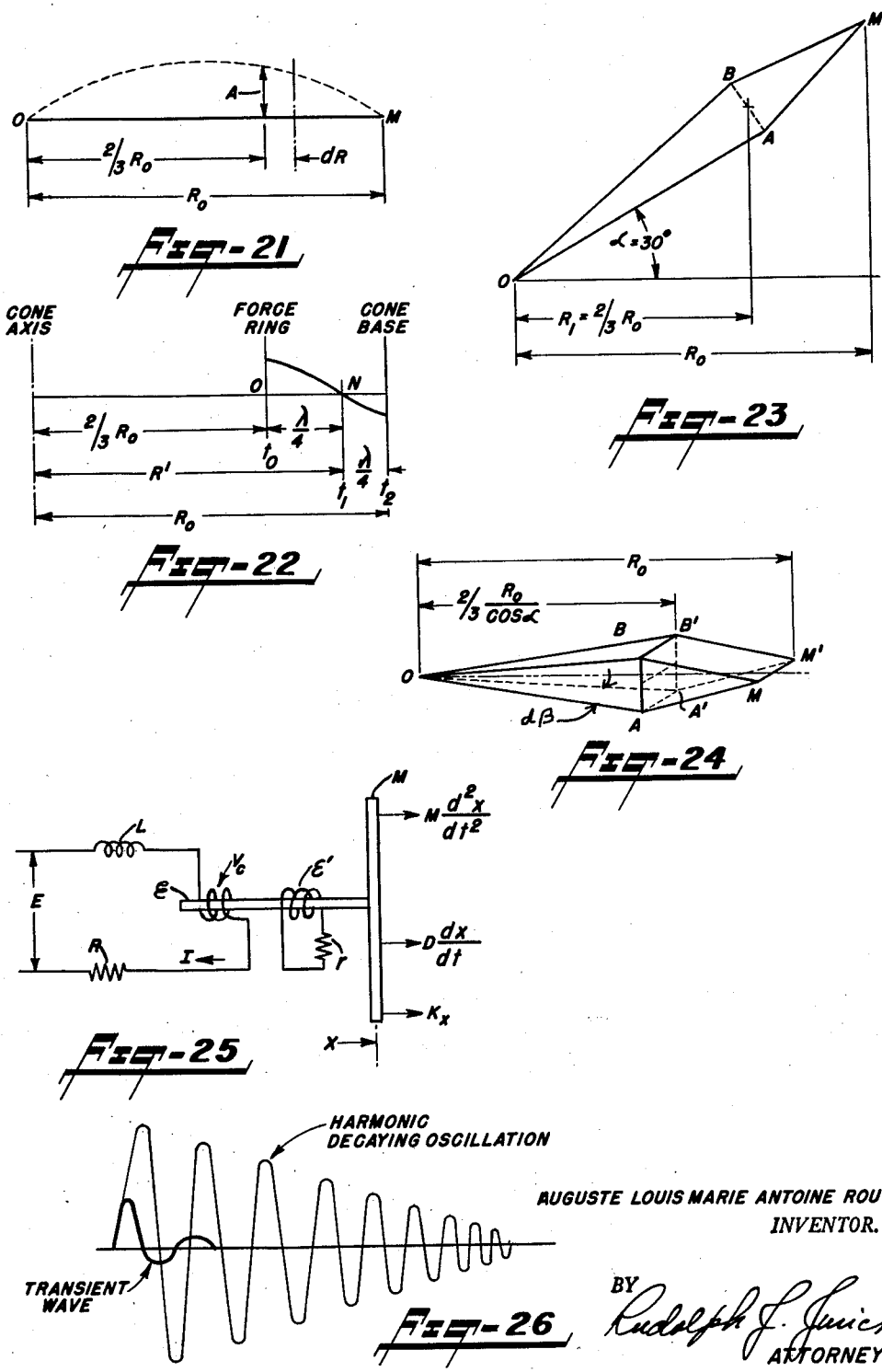

March 17, 1964  A. L. M. A. ROUY  3,125,647
ELECTRO-ACOUSTIC TRANSDUCER
Filed March 31, 1960  9 Sheets-Sheet 9

AUGUSTE LOUIS MARIE ANTOINE ROUY
INVENTOR.

BY
Radolph J. Junick
ATTORNEY

United States Patent Office 3,125,647
Patented Mar. 17, 1964

3,125,647
ELECTRO-ACOUSTIC TRANSDUCER
Auguste Louis Marie Antoine Rouy, 142 Edgemont Road, Scarsdale, N.Y.
Filed Mar. 31, 1960, Ser. No. 18,928
15 Claims. (Cl. 179—115.5)

This invention relates to electro-acoustic transducers commonly known as loud speakers and more particularly to the provision of such devices having a high fidelity response characteristic over an extended frequency range and providing a maximum amount of radiated power for a given input.

The perception of sound results from the transducing of pressure waves by the delicate and complex mechanism of the human ear which transforms the fluctuating pressure waves into physiological impressions. These impressions are compared on a ratio basis with respect to frequencies, intensities and duration. Although the human ear may not be perfect it, nevertheless, possesses astounding capacity in terms of resolving power, power acceptance and frequency translation. The ability of the ear to resolve a complex sound into its components is enormous. A trained ear can detect minute variations beyond the capability of instrumentation. As a consequence, the design of sound reproducing systems must take into consideration the parameters of the human ear and any neglected factor results in distortion and loss of quality which immediately becomes apparent to the listener.

The main parameters of the human ear to be reckoned with in the design of an electro-acoustic transducer are the threshold of perception, the frequency range and damping factor. With respect to the threshold of preception, the sensitivity of the ear decreases quite steadily toward the low and high frequencies. At a frequency of 400 cycles per second, the pressure variation is, approximately, 0.0002 dyne per square centimeter. As to frequency range, the ear is responsive within a range of 16–15,000 cycles per second, the upper limit varying considerably among individuals and generally decreases with age. A good sound reproducer, none the less, should provide a high fidelity response up to 15,000 cycles. In effect, the higher frequencies are perceived through frequency beats, which factor contributes greatly to the fullness and richness of sound. Experiments conducted with supersonic sirens are classical examples of this phenomenon. Two sirens operating, respectively, at 25,000 and 26,000 cycles per second produce a strong 1000 cycle beat when properly located relative to each other. With respect to the damping factor, the ear is a critically-damped mechanism and, as such, can reproduce any transient.

Since sound is a consequence of traveling pressure waves, any device which can generate harmonic pressure variations becomes a sound generator. Such generators can be classified in two main categories, namely, those in which an effective harmonic pressure variation of the sound-transmitting medium is directly produced and those which involve the transformation of a motion into pressure variations by dynamic coupling. A harmonic pressure variation in a sound-transmitting medium acting upon a surface, causes a displacement of the surface. Conversely, a harmonic displacement of a solid surface causes pressure variations of the contacting, elastic medium. Into this latter category fall the so-called movable cone loud speakers, as well as the pulsating piston and the pulsating sphere.

Among the different vibrating surfaces used to produce sound, the most effective one is that which follows precisely the shape of the sound wave. Since sound waves are spherical in nature, it follows that the necessary, precise relationship between the transmitting medium and the vibrating surface obtains only in the case of a pulsating spherical surface. In such device, the generated sound wave is spherical in shape as originated at the center of the sphere; diffraction is not present, and the source radiates at equal energy density in all directions. An oscillating, rigid piston, surrounded by an infinite baffle, also generates pressure waves whose direction of propagation coincides at the origin with the normal to the piston surface. However, due to diffraction, part of the radiated energy is directed in a direction perpendicular to the normal whereby there exist two directional components of the propagated waves. Although the mode of wave propagation is partly hemispherical, the piston actually is a directional radiator. The same is true with respect to the conventional vibratory cone loud speaker. The directional effect of a vibrating cone can be rather large and becomes more complicated since the incipient wave is conical in nature, thereby causing a local disturbance of the normal wave pattern. Consequently, the cone angle must be as large as possible in order to minimize the zonal distribution of the wave.

Since no ideal sound radiator is possible, other than a pulsating sphere, the design of a cone-type loud speaker must represent the best possible compromise, taking into consideration the mechanical characteristics of the cone diaphragm which characteristics basically are governed by the available driving power, or motive force. To-date, the design of a conical, sound-radiating surface remains a matter of compromise as no theoretical solution in available.

A conical-diaphragm loud speaker made in accordance with my invention is based upon a recognition and evaluation of the above factors toward the end that the device possesses improved operating characteristics far exceeding those posssible in devices of this class heretofore proposed.

An object of this invention is the provision of an electro-acoustic transducer providing high fidelity response over an extended frequency range and capable of radiating a relatively large amount of power.

An object of this invention is the provision of a loud speaker of the movable-cone diaphragm class and wherein the diaphragm is of novel construction with the drive coil coupled to the diaphragm at a critical point, thereby eliminating the formation of standing waves to improve the response characteristic of the speaker and provide a maximum conversion of input energy to sound wave propagation.

An object of this invention is the provision of a loud speaker wherein the conical, vibratory diaphragm comprises an inner member of low-density expanded material having thin metal skins bonded thereto and wherein the cross-sectional thickness of the diaphragm varies from a minimum value at the cone apex and base to a maximum value at a distance substantially two-thirds of the base radius.

An object of this invention is the provision of a loud speaker diaphragm of conical shape and comprising prestressed outer metallic skins bonded to an intermediate filler means of expanded, low density material.

An object of this invention is the provision of a loud speaker of the conical diaphragm class and wherein the drive coil is coupled to the diaphragm by a member of electrical conducting material.

These and other objects and advantages will become apparent from the following description when taken with the accompanying drawings illustrating certain embodiments of the invention. It will be understood, however, that the drawings are for purposes of illustration and are not to be construed as defining the scope or limits of the invention, reference being had for the latter purpose to the claims appended hereto.

In the drawings wherein like refernce characters denote like parts in the several views:

FIGURE 1 is a central, cross-sectional view of a loud speaker made in accordance with this invention;

FIGURE 2 is a fragmentary, side view of the metal supporting frame of the loud speaker;

FIGURE 3 is a fragmentary, top view of the supporting frame;

FIGURE 4 is a fragmentary, cross-sectional view showing the sandwich construction of the vibratory diaphragm and drawn to an enlarged scale;

FIGURE 5 is a similar view presented to facilitate an understanding of the pre-stressing factor as applied to the outer metallic skins;

FIGURE 6 is a diagrammatic representation showing the relative orientation of the three elements used to make the cone diaphragm;

FIGURE 7 is a fragmentary diagrammatic representation of a mold suitable for forming the diaphragm;

FIGURE 8 is a radial, cross-sectional view of the corrugated member forming the flexible support between the diaphragm and the frame of the speaker, and drawn to an enlarged scale;

FIGURE 9 is a cross-sectional view taken along the diameter of the conical diaphragm;

FIGURE 11 is a cross-sectional view taken along the line 11—11 of FIGURE 10;

FIGURE 12 is a cross-sectional view taken along the line 12—12 of FIGURE 10;

FIGURES 13–15 are diagrammatic representations for the purpose of developing the theory of the elastic deformation of a surface upon application thereto of driving forces at different points;

FIGURE 16 is a diagrammatic representation of an elemental section of a disc presented for the purpose of developing bending moments upon the application of a force thereto;

FIGURES 17 and 18 are diagrammatic representations for developing the moment of inertia and weight factor of an elemental section of a cone-shaped, sandwich type diaphragm;

FIGURE 19 is a diagrammatic representation showing the geometric parameters of a sandwiched cone diaphragm made in accordance with this invention;

FIGURE 20 is a graph showing the variation of the wave velocity factor for a sandwich cone having metal skins of different thicknesses;

FIGURE 21 is a diagrammatic representation for development of the surface amplitude function;

FIGURE 22 is a diagrammatic representation of the diaphragm showing the second harmonic standing wave;

FIGURES 23 and 24 are representations of elemental sections of the sandwich cone for computation of the weight factor;

FIGURE 25 is a diagrammatic representation of the electrical and mechanical equivalents of the complete loud speaker;

FIGURE 26 represents the transient and decay function of the system;

Figure 10:
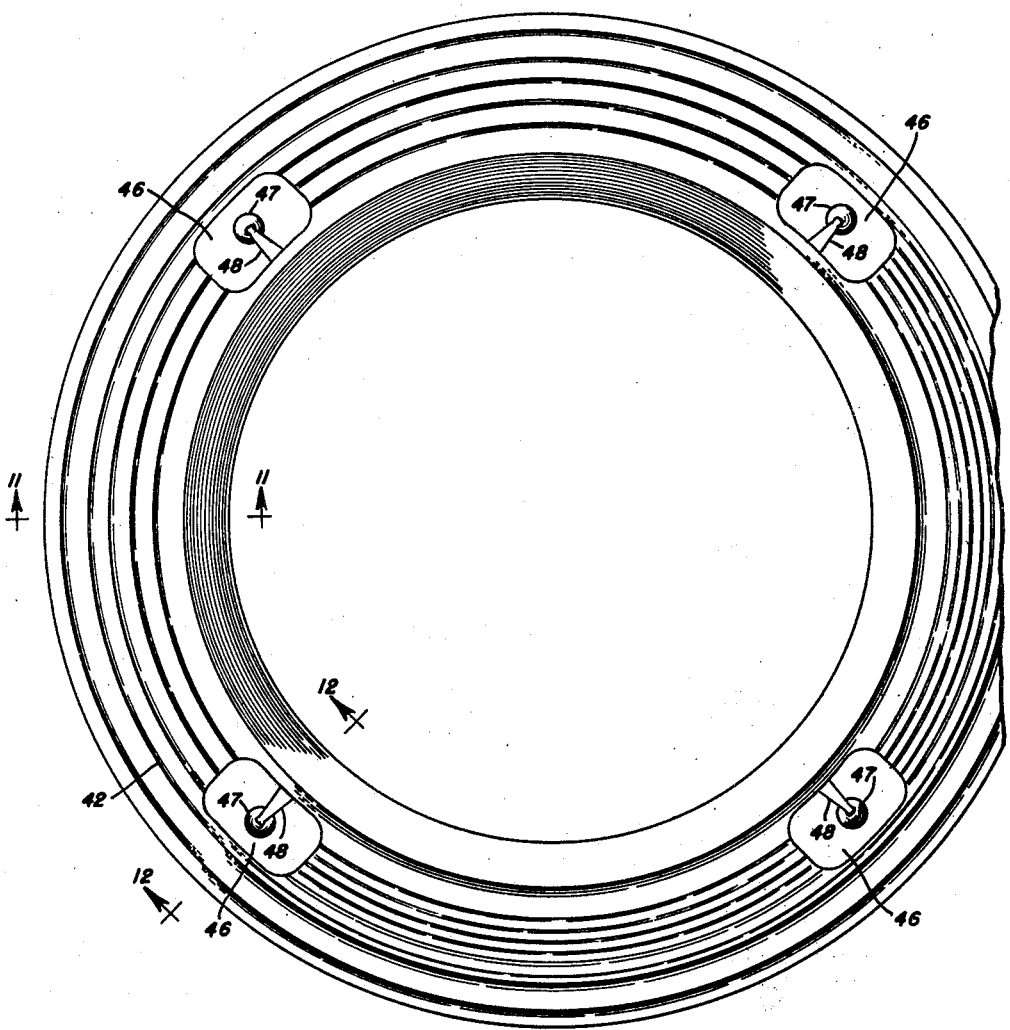
FIGURE 10 is a top view of the spider used for guiding the drive coil in its vibratory movement in the magnetic flux gap.

Referring, now, to FIGURES 1, 2 and 3, the individual components of the loudspeaker are carried by a circular supporting frame 10 that is open at both ends and having an integral, outwardly-extending flange 11. Such flange is provided with a plurality of holes 12 to accommodate screws or bolts (not shown) for securing the load speaker to a baffle, or etc. The frame may be pressed out of relatively thin steel having, for example, a wall thickness of approximately 1/16 inch. The frame is provided with a plurality of openings 13 to reduce the overall weight and a plurality of axially-extending reinforcing ribs 14 to increase the overall rigidity. An integral, inwardly extending flange 15 supports the magnetic structure.

The magnetic structure comprises a ring magnet 18 having cemented thereto a first, soft-iron pole piece 19 and a second soft-iron pole piece 20. Complementary ends of the pole pieces are spaced apart to form a circular air gap 21 in which is disposed the drive coil 22, said coil being secured to a circular ring member 23 which, in turn, is secured to the conical diaphragm 24. The pole pieces are firmly secured to the magnet by means of a suitable cement and the clamping ring 25. The clamping ring may be made of a suitable non-magnetic metal, preferably brass, and serves two purposes, namely, to provide a proper alignment between the magnet and the pole pieces and as a clamping means to retain such parts in proper orientation. In the assembly of these parts, the contacting surfaces of the magnet and pole pieces are coated with a suitable cement, such as, for example, polyurethane. The clamping ring is heated, as by immersion in boiling water, to expand same and then is placed in position. Upon subsequent cooling, the clamping ring contracts to the original size, thereby providing a positive, permanent, force-type clamping action. The assembled magnetic structure rests upon the inwardly-extending flange 15 of the frame 10, and is secured thereto by a plurality of bolts 16 passing through appropriate holes formed in the flange and into threaded holes formed in the pole piece 20.

The conical diaphragm 24 is suspended from the frame 10 by a corrugated peripheral portion 26 which is provided with a plurality of circumferentially-spaced holes aligned with similar holes formed in the frame flange 11. Individual bolts 27, having heads disposed in a U-shaped ring member 28, cooperate with the nuts 29 to secure the diaphragm to the frame. The ring member 28 and the supporting portion of the frame serve to clamp the corrugated portion 26 along its entire peripheral extent and the upstanding arms of the ring member prevent rotation of the bolts 27 when the cooperating nuts are threaded thereon, thereby facilitating assembly of the device and preventing a buckling or stretching of the flexible member 26. The shape and construction of the diaphragm will be described in detail hereinbelow. Suffice to state, at present, such diaphragm is a pre-stressed unit made of a rigid, low density, expanded material sandwiched between metallic foil skins, and the cross-sectional thickness of the diaphragm is not constant, all for the purpose of providing a loud speaker having greatly improved response characteristics. The drive coil 22 must be guided in its vibratory movement within the air gap to thereby permit the use of an air gap having a minimum length. For this purpose, I utilize a circular spider 29 of the spoke type, the inner end of the spider being cemented to the diaphragm and the outer end being supported by and cemented to the pole piece 19, generally as shown in FIGURE 1. The construction of the spider also will be described in detail hereinbelow.

SHAPE AND CONSTRUCTION OF THE RADIATING SURFACE

The shape and construction of the diaphragm will now be described. It is known that the amplitude of movement of a sound-radiating surface varies as the reciprocal of the mass and that the power dissipated into a load is also affected by the mass. In fact, the dissipated power, or useful power, can be computed from the expression:

$$W = \int_0^T F dx = \int_0^T Fv dt \quad (1)$$

in which $$F \simeq D \frac{F_0 \omega \cos(\omega t - \phi)}{M\sqrt{(\omega_0^2 - \omega^2)^2 + \omega^2 \rho^2}}$$

and $$v = \frac{F_0 \omega \cos(\omega t - \phi)}{M\sqrt{(\omega_0^2 - \omega^2)^2 + \omega^2 \rho^2}} \quad (2)$$

where:

$F_0$=peak electro-motive force in dynes,
$D$=damping force in dynes per cm./sec.
$\omega_0$=resonance angular velocity=$2\pi\nu_0$,
$W$=work in ergs produced by damping force,
$\rho = D/M$=Ratio of damping force D by the mass M in grams,
$\omega$=angular velocity of the imposed frequency $\nu$.

Thus, the power in ergs per second has the value:

$$W = \left(\frac{F_0}{M}\right)^2 \times \frac{D}{2} \times \frac{\omega^2}{[(\omega_0^2 - \omega^2)^2 + \omega^2 \rho^2]} \quad (3)$$

$$= \left(\frac{F_0}{\sqrt{2}}\right)^2 \times \frac{D}{M^2} \times \frac{\omega^2}{[(\omega_0^2 - \omega^2)^2 + \omega^2 \rho^2]} \quad (4)$$

It will be seen, then, that since the useful power is proportional to the reciprocal of the square of the mass, the mass must be reduced to the extreme limit. Also, the resonance frequency of the diaphragm must be made as small as possible to avoid emphasis of the frequencies within its vicinity. Further, when a transient reproduction is concerned, the damping of the radiating surface must be critical, otherwise, the displacement is not the image of the energizing impulses.

Although the mass of the radiating surface must be decreased to the utmost, mechanical rigidity must be preserved, which presents structural problems. If the driving force acting upon the radiator is centralized at one point, the distributed inertia forces and the evenly distributed pressure reaction of the sound-transmitting medium results in an elastic deformation of the radiator. The deflection amplitude is not constant over the entire radiating surface. Thus, in the case of a flat radiator (or piston) the edges remain fixed while the center (point of application of the force) undergoes maximum amplitude displacement with a correlative decrease of the coupling factor to the medium. Basically, the elastic resonance condition is governed by the relationship:

$$C = \sqrt{\frac{EI}{\delta A}} \quad (5)$$

where:

C is the wave velocity factor,
E is the Young modulus of the radiator,
I is the moment of inertia,
A is the cross-section area of the radiator, and
$\delta$ is the specific gravity of the material.

The resonance of the piston occurs at frequencies within the audible range and at frequencies which are multiples of the fundamental. Hence, the whole spectrum of resonance frequencies is injected into the sound wave. Naturally, if the force acting upon the radiator is evenly distributed throughout the radiating surface, the problem of standing waves does not exist.

Thus, in designing the sound radiator, it is essential to increase the product EI and decrease the distributed mass $\delta A$, while incorporating into the structure as much damping as possible to reduce the resonance amplitude.

For a given material, the ratio $I/A$ can be increased by increasing the thickness of the radiator. The wave velocity factor C becomes proportional to the thickness of the material but at the same time the total mass M of the radiator increases in the same proportion thereby limiting the radiated power in proportion to the reciprocal of the square of the mass. Merely increasing thickness, therefore, is not the solution to the problem. Increasing the Young modulus E offers an alternative but this must be done with due consideration given to the specific gravity $\delta$ of the material. The ratio between the Young modulus and specific gravity is here listed for various materials which may be appropriate for construction of the sound radiator;

| | $\frac{E}{\delta}$ | $\sqrt{\frac{E}{\delta}}$ |
|---|---|---|
| Aluminum | $\frac{69.6}{2.7} \times 10^{10}$ | $5.06 \times 10^5$ |
| Beryllium | $\frac{200}{1.85} \times 10^{10}$ | $10.4 \times 10^5$ |
| Magnesium | $\frac{41.8}{1.74} \times 10^{10}$ | $4.90 \times 10^5$ |
| Titanium | $\frac{150}{4.5} \times 10^{10}$ | $5.78 \times 10^5$ |
| Card Board | $\frac{1.935}{.91} \times 10^{10}$ | $1.46 \times 10^5$ |

Cardboard would appear to be the worst selection for the radiator material, but a cardboard radiator can be made with a relatively high damping factor. Beryllium is the best material, for this purpose, but, at present, it is not commercially available in the form of very thin foil. Aluminum, therefore, is selected as it is the most readily available even though its internal damping is not as high as that of magnesium.

In considering the wave factor C, the important aspect of the standing wave configuration cannot be ignored. Standing waves are detrimental for two reasons, namely, resonance emphasis and partial cancellation of the radiated energy. In the case of a piston radiator, the piston surface can be the source of full standing waves of opposite sign whereby the net radiated output decreases abruptly through phase angle cancellation. A flat piston radiator capable of exhibiting high resonance frequencies is incompatible with maximum radiated power. This limitation may be overcome by using geometrical shapes of such configuration that for a given projected plane surface area the materials operate in compression or tension, rather than bending. Specifically, a cone shape may be used with good results.

Any axial force acting at the apex of a cone is decomposed into a radial component and a tangential component. The radial component is balanced, partially, by the elastic elongation of the elementary circular section of the cone, while the tangential component involves the compression or extension of the material. Thus, the bending moment along the surface of the cone is much smaller than for a flat disc but it does still exist and varies from the cone apex to the cone base. This variation of the bending moment along the wall of the cone causes standing waves to appear. The analytical expression for the cone standing wave is quite complicated but it can be stated that the standing wave patterns in a cone-shaped radiator are in all respects homologous to those of a disc-shaped radiator but involve higher frequencies. A radiator made of cardboard has an intrinsically high damping factor but a thin-wall, cone-shaped radiator made of such material is not a good solution to the problem of high fidelity sound reproduction because of the effect of the standing waves.

A vibratory cone of constant wall thickness is the seat of a curious phenomenon which appears under certain loading conditions. When the driving force applied to the apex of the cone exceeds a certain magnitude, there appears the one-half ($\frac{1}{2}$) subharmonic of the applied frequency together with the odd harmonics of such subharmonic. The resulting distortion of the sound is very noticeable not only because of the unwanted frequencies, but also on account of the change of the ear reference base which shifts toward a lower frequency.

All of the above factors must be considered in the design of a sound radiator having a high fidelity response. Very little can be done with respect to the elastic characteristics and specific gravity of the material per se. I, therefore, attack the problem on the basis of the structural design of the material, or materials, of which the cone-shaped diaphragm is to be made.

Referring to FIGURE 4, consider the cross section of a "working skin" in which the rigid material $M_1$ comprises two thin layers, each having a thickness $t$ and separated from each other by a relatively thick layer $M_2$ of very light material, such material being expanded and of low specific gravity as, for example, expanded hard rubber which has an apparent specific gravity of 0.02 and yet retains a high compression or crushing strength. When effectively bonded together, the assembly becomes a single unit of interesting properties with respect to the bending strength and wave velocity. Neglecting, for the moment, the contribution of the light material $M_2$ in comparison with the material $M_1$, of high elastic modulus, the moment of inertia, $I$, for the combination may be expressed as:

$$I=\frac{b}{12}[h_2^3-h_1^3]=\frac{b}{2}\times h_1^2 t\left[1+2\frac{t}{h_1}\right] \quad (6)$$

where:

$b$ is the width of the elemental section,
$h_1$ is the thickness of the center material,
$h_2$ is the thickness of the combination, and
$t$ is the thickness of each skin.

The moment of inertia $I_t$ for the skin material is:

$$I_t=\frac{2}{3}bt^3$$

and the ratio of these two moments of inertia becomes:

$$\frac{I}{I_t}=\frac{3}{4}\times\frac{h_1^2}{t^2} \quad (7)$$

It can be seen that when $h_1$ becomes larger than $t$ the increase of the moment of inertia is very rapid. For example, if the thickness $t=.02$ cm.$=0.008''$ and $$h_1=1 \text{ cm.}\cong 0.40''$$

the ratio becomes:

$$\frac{I}{I_t}=\frac{30000}{16}=1875$$

A certain added weight accompanies the increase in transverse rigidity. The amount of this weight is:
$W_2=bh_1\delta_2$, where $\delta_2$ is the specific gravity of the material $M_2$.

This weight is to be added to the weight of the working skin. Thus, the wave velocity factor becomes:

$$C=\sqrt{\frac{E\frac{b}{2}\times h_1^2 t}{b(2t\delta_1+h_1\delta_2)}}=2.33\times 10^5 \text{ cm./sec.} \quad (8)$$

when the skin material is aluminum:

$t=0.02''$
$\delta_1=2.7$
$\delta_2=.02$, and
$h_1=1.0$

Considering a standing quarter wave 10 cm. long, its frequency is approximately 5830 cycles per second for the sandwiched material, whereas for cardboard 0.06 cm. thick such wave frequency is approximately 63 cycles. The weight of the sandwiched material is 0.128 gr./cm.$^2$ compared to 0.054 gr./cm.$^2$ for the cardboard. Thus, the weight of the sandwiched material roughly is 2.5 times that of the cardboard but the frequency has increased by a factor of some 92 fold. It, therefore, is apparent that the cone radiator of sandwiched material offers practical advantages. When the thickness of the filler material is relatively large compared to the thickness of the foil skins, the wave velocity becomes quite independent of the thickness $t$, specifically, $$C=\sqrt{\frac{Eh_1^2\left(1+\frac{2t}{h}\right)}{2\delta_1\left(1+\frac{\delta 2h}{2\delta_1 t}\right)}}\approx\sqrt{\frac{Eh_1^2}{2\delta_1}} \quad (9)$$

The fundamental properties of the sandwiched material have been determined as far as resistance to bending moments and weights are concerned. Another, and most important, factor is the static and dynamic stability of the structure. The sandwiched cone represents a typical case of the general theory governing the design of the "working skin," which structure has been developed as an extension of the general theory of elasticity, as applied, for example, to thin veil dams, bridges, etc. Although the theoretical developments and surface analysis of such structures leads to very complex relationships, they are, nevertheless, governed by a simple and fundamental theorem, namely; the load stressing should not, in any case, change the sign of the strain at any point of the surface. If a surface works in compression, the amount of extension prestressing of the skin must be at least equal to the maximum compression stress and vice versa. The change of sign of the strain under loading causes local and even general buckling of the structure. Thus, the sandwiched cone construction will satisfy the condition of dynamic stability if an adequate prestressing can be imposed on the skins during manufacture of the cone. The sign of the prestressing factor, compression or extension, can be determined by a simple inspection of the cross section of the sandwiched structure. Referring to FIGURE 5, consider the working skins $A-B$ and $A'-B'$ separated by a layer of expanded material $m$. When a force F acts upwardly upon the surface of $A'-B'$ an extension stress $+f$ appears on the skin $A-B$ and a compressive force $-f$ is developed on the skin $A'-B'$. On the other hand, when the applied force is of opposite sign $(-F)$ a compressive force $-f'$ develops in the skin $A-B$ and a corresponding extension force, $f'$, is developed in the skin $A'-B'$. The stability of the structure is preserved when the prestressing force $F_e$ (extension stressing) initially is imposed on the skins $A-B$ and $A'-B'$ such that $$F_e > -(-f')$$

Prestressing of the working skin can be achieved during the manufacture of the cone-shaped diaphragm. Reference now is made to the diagrammatic representation of FIGURE 6. Here I show two preformed, straight cones 30 and 31 made of aluminum foil having a thickness of, say 0.008''. The external surface of cone 30 and the internal surface of cone 31 are each sprayed with a bonding compound, compatible to both the metal and the filler such as, for example, polyurethane, chlorinated rubber base. Between the cones 30 and 31 is placed a cone 32 of virgin (not yet expanded) filler material that is loaded with an appropriate expanding material such, for example, ammonium carbonate. It is here pointed out that the cone 32 has an increased thickness along an annular section 33 which section is substantially at a distance 2/3 R, where R is the radius of the cone base, for purposes which will be described in detail hereinbelow. At present, suffice to say that the driving force applied to the completed diaphragm will be applied at the radial distance 2/3 R. Along the circular path 2/3 R the cone 32, when expanded, will have a higher specific gravity and, consequently, a higher crushing and deformation strength. Additionally, the increased thickness of the cone 32, at the point 33, results in an exceptionally strong linkage between the two metal foils.

FIGURE 7 is a cross-sectional view of the mold used to from the composite, or sandwiched, diaphragm. The mold comprises an upper stction 34 and a mating lower section 35 to provide a cavity 36 corresponding in configuration to the finished diaphragm. Such cavity may include a peripheral, corrugated section 37 corresponding to the flexible portion 26 shown in FIGURE 1. The assembly of the three cones, shown in FIGURE 6, is placed into the mold and the mold is closed thereby firmly clamping the metal cones at their apexes as well as at their peripheral edges. Upon heating of the mold, the inner core 32 expands forcing the metal cones to contact the walls forming the mold cavity thereby stretching the metal skins in all directions and applying thereto the certain amount of prestressing in extension. After curing and opening of the mold, the sandwiched material expands a little more imparting an auxiliary amount of prestressing. By proper construction of the mold cavity, and with due consideration given to the size of the three individual cones and to the profile of the specific filler material, a predetermined amount of prestressing is applied to the working outer skins and the density of the expanded material can be made to vary from a minimum at the apex and base of the diaphragm to a maximum along the annular section having a desired radius. By forming the completed diaphragm, as here described, the outer surfaces of the aluminum cones can be made absolutely smooth, which is highly desirable.

As an alternative to the above-described method of forming the sandwiched diaphragm, the filler cone 32 can be expanded and cured as a separate operation and placed into the mold between two straight, aluminum foil cones having the bonding compound coated on appropriate surfaces. Closure of the mold, then, causes the metal cones to stretch to conform in contour to that of the inner cone made of the filler material.

As another alternative, the corrugated, flexible, peripheral portion of the diaphragm may be a separate member 38, as shown in radial cross-section in FIGURE 8. The member 38, made of elastic rubber, is placed into the mold cavity section 37 (see FIGURE 7) with the inner edge disposed between the two aluminum cones and abutting the base edge of the filler-material cone. A suitable bonding cement is applied to the engaged surfaces of these four members whereby the ring 38 becomes firmly bonded to the cones during formation of the diaphragm.

The required low specific gravity of the expanded material requires an inner, filler cone 32 of thin cross-section in the unexpanded state. Toward this end, the expandable material can be applied to an appropriate surface of one of the metal cones by spraying directly over the bonding cement previously applied to such surface.

The completed, composite diaphragm 24, including the corrugated flexible portion 26, is shown in central cross-section in FIGURE 9. It will be noted that the thickness of the diaphragm varies from a minimum at the apex and base to a maximum along a circle having a radius of 2/3R.

It will be appreciated that my method of making the sandwiched diaphragm not only secures an exact concentricity of the individual elements but also produces an even stretching of the metal working skins through expansion of the filler material. The outer surfaces of the completed diaphragm are free of ripples whereupon the diaphragm can withstand high loading factors.

THE SPIDER GUIDE

The drive coil of the loud speaker must be guided in its vibratory movement within the air gap to avoid the necessity of providing a long gap which requires an increase in the size of the magnet to develop the required magnetic flux density in the air gap. As shown in FIGURE 1, a spider 29 serves this purpose. It will be noted that the spider is attached to the diaphragm, as by cement, along a circular section having a radius of two-thirds the base radius of the cone, and that the coupling member 23, carrying the drive coil, likewise is secured to the diaphragm along such circular section. Such arrangement is very advantageous as the driving force is applied to the diaphragm along a circle quite close to the center of gravity of the sandwiched diaphragm and the inter axes coupling is reduced to a minimum. The spider preferably is of the spoke type to reduce its oscillatory mass as much as possible. By making the spider of thin plastic material, the design provides ample radial rigidity for a spoke-type construction.

Reference is now made to FIGURE 10 which is a top view of the spider, FIGURE 11, which is a cross-sectional view taken along the line 11—11 of FIGURE 10, and FIGURE 12, which is a cross-sectional view taken along line 12—12 of FIGURE 10. The spider comprises a unitary, plastic member having a somewhat tapered side wall 40 with the relatively thick, lower portion formed into an outwardly extending flange 41 and the upper relatively thin section merging into the corrugated section 42. The flange 41 is designed to rest upon the upper pole piece 19, see FIGURE 1, which pole piece is ground, or otherwise formed to provide a flat rest for the flange 41 and a shoulder for abutting the spider wall 40. The flange and the wall of the spider are cemented to the pole piece, it being apparent that the provision of the shoulder on the pole piece serves as a means for properly centering the spider with respect to the magnetic structure and the diaphragm.

Referring, again, to FIGURES 10-12, the corrugated portion 42 of the spider terminates in a relatively thick force-ring 43 having an inwardly-sloping surface 44 and an integral, downwardly-extending ring 45. The slope of the surface 44 coincides with the slope of the conical diaphragm at the circular section along which the diaphragm is cemented to the spider. On the other hand, the coupling cylinder 23, carrying the drive coil, is cemented to the ring 45 of the spider.

While the main functions of the spider are to guide the cone in its vibratory motion and to permit frictionless displacement of the drive coil within the magnetic flux gap, the spider builds up a restoring force effecting the resonance frequency of the system. In order to lower the resonance frequency, the spider should not be rigid along its axis, yet, it must retain good radial stability. In other words, the spring rate of the spider must be low along an axis perpendicular to the plane of the spider and large along an axis on the plane of the spider. Toward these ends, I provide a plurality of openings 46 in the corrugated portion of the spider. The shape of the corrugations and their thickness generally is determined by trial and error although it is possible to compute these parameters with a sufficient approximation.

The resonance frequency of the diaphragm becomes manifest at different standing wave shapes, mostly at the half-wave length. Although the sandwiched construction of the diaphragm inherently offers a high factor of internal damping at the resonance frequency corresponding to the one-half wave length, the anti-nodal amplitude can become appreciable and produce objectionable distortion in a system designed for high fidelity response. I provide for absorbing and dissipating such resonance wave energy by means of an elastic system mounted at the anti-nodal point of the diaphragm which is in the vicinity of the force ring, that is, the circle having two-thirds the base radius of the cone. Such damping means comprises tuned dampers 47 provided on the spider within the spaces left open between the spokes of the spider. Inasmuch as the amount of damping required for this purpose is very small, the dampers 47 need have a total mass of only 2-3% of the mass of the entire oscillating system. The dampers 47 can be molded of plastic material similar to that of the spider and are supported from the section 44, of the spider, by means of relatively thin, plastic-material arms 48. The small amount of internal hysteresis characteristic of the molding material permits easy tuning of the resonator so constructed. As a practical matter, the dampers 47 can be tuned individually to slightly different frequencies, thereby covering a wide range of resonance frequencies, such tuning being accomplished by filing.

DRIVING MODE FOR THE CONICAL DIAPHRAGM

The method of driving the cone must by all means eliminate the production of the half sub-harmonic and reduce, if possible, the cancellation of the radiated power by the out of phase motion of different zones of the radiating surface. Also, the standing wave pattern should be shortened as much as possible. Here, analysis of the standing wave pattern is desirable. Since a heavy loading at the cone apex generates the half sub-harmonic and its signal, the driving force must be applied to the cone at points removed from the apex. Obviously, an even distribution of the driving force over the entire area of the cone would be ideal but not practical. Since it is desirable to distribute the driving force over as large an area as possible, practical considerations would appear to dictate that the drive coil be coupled to the cone along a relatively large circle. For example, and with specific reference to FIGURE 13, a force F applied in a circle of radius R to the diaphragm section 50, yields elemental forces $f$, given by the relationship:

$$f = \frac{F}{2\pi R} \text{ per unit length} \qquad (10)$$

The larger the radius R of the circle of distribution the smaller the elemental forces $f$ per unit of length. However, as soon as the radius R becomes large, one approaches the point where the circle corresponds to a specific pattern of standing waves of short wave length. Considering the elastic deformation pattern $\Sigma_1$ of the surface, we can place the circular ring of elemental forces $f$ right at the nodal point A and B of the half standing wave whose length is $$\frac{\lambda_1}{2} = R_0$$

while if the total force F acted at the center 0, the wave form $\Sigma_2$ would correspond to a half wave for twice the radius, $$\frac{\lambda_2}{2} = 2R_0$$

Thus, when the force F is applied to the point 0, the fundamental frequency of the driving force is decreased by a factor of 2. However, in such case, and when doubling the frequency, the displacements of the diaphragm surface corresponding to the radial zones $A-A_0$ and $B-B_0$ is in phase opposition to the displacement of the zone $A-B$, resulting in pressure wave cancellation, see FIGURE 14. On the other hand, excitation of the diaphragm at the nodal points A and B, see FIGURE 15, by the elemental forces $f$ produces an elastic deformation of the surface in the form of two, half waves ($\lambda/2$) in parallel, with the net result that the displacements of the zonal surfaces $A-A_0$, $A-B$, and $B-B_0$ remain in phase. Although resonance can exist, there is no pressure cancellation by phase opposition. Thus, in the case of a flat (disc) diaphragm the drive coil must be of such diameter as to be close to half the total diameter of the disc. However, in order to minimize the distortion of the surface resulting from the equal density of the reacting forces (air wave pressure) on the disc, it is necessary to select a radius R for which the sum of the moments of the reacting forces is zero.

Reference, now, is made to FIGURE 16. Considering an elementary sector 51 of a disc corresponding to a very small central angle $\alpha$ and neglecting the terms of the second order, the moment for the surface zone $A_0B_0XX'$ is expressed by:

$$dM_{xx'}p = p(R+X)\alpha x dx$$

or $$M_{A_0B_0xx'} = p\alpha\left[\frac{R}{2}(R_0-R)^2 + \frac{1}{3}(R_0-R)^3\right] \qquad (11)$$

where $p$ is the acoustical pressure per unit area.

For the surface XX'O, the value of the moment becomes:

$$M_{XX'O}p = p\alpha\frac{R^3}{6} \qquad (12)$$

Equating the sum of these two moments to zero results in:

$$R = \frac{2}{3}R_0 = 0.6667R_0 \qquad (13)$$

The value of R, thus obtained, differs from the one which would be obtained by a summation of the forces over the entire area, namely:

$$R = \frac{\sqrt{2}}{2}R_0 = 0.707R_0$$

It will be seen, then, that excitation of the diaphragm along a circle corresponding to the nodal points of a half wave is highly desirable. In the case of a loud speaker this requires a drive coil of relatively large diameter, but this is a relatively small price to pay for the gains achieved, namely:

(1) the absence of any sub-harmonic wave and sequel thereof,
(2) the increase of the resonance frequency by a factor of 2,
(3) the absence of phase cancellation of the radiated energy at that same high resonance frequency at which it would otherwise occur,
(4) a considerable increase of the effective load which remains close to unity at the higher resonance frequency,
(5) a considerable increase of the effective radiating surface for the high frequencies, and
(6) a greatly increased resistance to buckling under the reactive load, there being no mechanical twist at the circle of application of the driving force since the bending moments are equal.

Adding to the above parameters, the use of a sandwiched material of a very high wave velocity and high internal damping, the sound radiator presents exceptionally good overall response characteristics for high fidelity systems.

STANDING WAVE FREQUENCY FOR SANDWICHED CONES

When the thickness, or profile, of the sandwiched structure remains constant, the computation of the standing wave frequency is rather simple. The wave velocity factor:

$$C = \sqrt{\frac{EI}{\delta A}} \qquad (14)$$

remains constant. However, in the case of a cone of variable thickness, the computation becomes more complicated and involves the determination of the mean average velocity factor entering into the wave pattern. However, from a practical standpoint, it is sufficient to determine the mean wave velocity in steps along the length of the standing wave pattern. For that purpose, the velocity factor C is computed at distances of 0, $l/4$, $l/2$, $3l/4$ and $l$, taken from the force circle passing at the plane AB, see FIGURE 17. The weight of both of the metal skins 51 and the filler material 52 will be taken into account but only the contribution of the skin thickness $t$ is considered in developing the moment of inertia. Also, the increased rigidity resulting from radial expansion of the metal cone is neglected.

Under these conditions, and with reference to FIG-

URE 18, the moment of inertia of the cross section of an incremental element of transverse length $b$, becomes:

$$I = \frac{b}{12}[(h+2t)^3 - h^3]$$

$$= \frac{b}{12}[6h^2t + 12ht^2 + 8t^3]$$

$$= \frac{b}{2}h^2t\left[1 + 2\times\frac{t}{h} + \frac{4}{3}\times\frac{t^2}{h^2}\right] \quad (15)$$

where:
$b$ is the transverse length of the incremental section,
$t$ is the thickness of the metal skins 51, and
$h$ is the thickness of the filler section 52.

The weight factor of the section becomes:

$$\Sigma \delta A = 2bt\delta_1 + bh\delta_2 = 2bt\delta_1\left(1 + \frac{h\delta_2}{2t\delta_1}\right) \quad (16)$$

The ratio of equations (15) and (16) becomes:

$$\frac{I}{\Sigma \delta A} = \frac{h^2}{4\delta_1} \times \frac{\left(1 + \frac{2t}{h} + \frac{4t^2}{3h^2}\right)}{\left(1 + \frac{h\delta_2}{2t\delta_1}\right)} \quad (17)$$

It will be noted that as long as $h$ is large with respect to $t$, the ratio $$\frac{1}{\Sigma \delta A}$$

is but little effected by $t$.

If, now, we consider the section shown in FIGURE 18 as made up of aluminum skins each having a thickness, $t$, of 0.02 cm. (specific gravity $\delta_1$ of 2.7 and a Young modulus, E, of $69.6\times10^{10}$ dynes/cm.$^2$) and filler material having a specific gravity $\delta_2$ of 0.02, the wave velocity, C, for such section is shown in the following table No. 1 for different thicknesses, $h$, of the filler material.

*Table No. 1*

| h | 1 cm. | .75 cm. | .50 cm. | .25 cm. | 0 |
|---|---|---|---|---|---|
| $C\sqrt{\frac{EI}{\Sigma \delta A}}$ | 238×10³ | 183×10³ | 126×10³ | 67×10³ | 5.84×10³ |

If, now, we change the filler material to one having a specific gravity of 0.03 maintaining all other factors constant, the wave velocities are shown in Table No. 2.

*Table No. 2*

| h | 1 cm. | .75 cm. | .50 cm. | .25 cm. | 0 |
|---|---|---|---|---|---|
| $C\sqrt{\frac{EI}{\Sigma \delta A}}$ | 229×10³ | 178×10³ | 123×10³ | 66.5×10³ | 5.84×10³ |

On the other hand, if we now change the thickness of the aluminum skin to 0.03 cm. and retain all other factors constant, including a filler material specific gravity of 0.02, the wave velocities become,

*Table No. 3*

| h | 1 cm. | .75 cm. | .50 cm. | .25 cm. | 0 |
|---|---|---|---|---|---|
| $C\sqrt{\frac{EI}{\Sigma \delta A}}$ | 247×10³ | 189.5×10³ | 130.5×10³ | 70.1×10³ | 8.8×10³ |

As a comparison, it is here pointed out that for cardboard having a thickness, $t$, of 0.06 cm. a specific gravity of 0.91 and a Young modulus of $1.935\times10^{10}$, the wave velocity factor is $2.52\times10^3$.

FIGURE 20 is a graph showing the variation of the wave velocity factors for sandwiched type diaphragms having the constants set forth in Tables 1, 2 and 3, above. Within a range of values involving a metal foil thickness varying from 0.02 to 0.03 cm.. and an apparent specific gravity of the filler varying between 0.02 and 0.03, the wave velocity factor does not vary significantly when the thickness of the filler material exceeds, say, 0.25 cm. This means that for a generally-triangular cross-section cone of sandwiched construction, (see FIGURE 9) the mean average wave velocity factor can be taken as $$C = 125 \times 10^3 \text{ cm./sec.}$$

Although the standing wave is somewhat deformed on account of the greater rigidity of the sandwiched cone to radial expansion near the cone apex, only a small error will be made if we use the distance of 7.85 cm. as one quarter of the wave length, whereupon the sandwiched cone will have a base diameter of 16 inches and an apex angle of 120 degrees, as shown in FIGURE 19.

For the half wave length standing wave, the frequency may be taken in the neighborhood of 3300 cycles for a length of 7.85 cm. (distance A–M FIGURE 19) and 1950 cycles for a length 15.95 cm. (distance D–M FIGURE 19), in the absence of stiffening of the cone due to radial expansion.

In view of the uncertainty of the exact length of the standing wave pattern, we can take the intermediate frequency, corresponding to the mean average of the two extreme frequencies, for purposes of analysis. In such case, the most probable first resonance frequency occurs at about:

$$\nu = \frac{3300 + 1950}{2} = 2600 \text{ cycles}$$

and its higher harmonics would have frequencies of 5200, 10,400, 20,800, etc., cycles per second. These harmonic and resonance frequencies of the sandwiched cone compare to the frequencies of 31.5, 63, 126, 252, etc., for a cardboard cone of similar dimensions and excited at the apex. It will be apparent that such frequencies of a cardboard cone yield a complex resonance spectrum difficult to manage. Even if the cardboard cone is driven by a force ring having a radius of two-thirds the base radius of the cone, the fundamental frequency is of the order of 78.7 cycles per second, the spectrum being reduced only one resonance frequency.

Due to the change of the wave velocity factor as a function of the distance from the circle of application of the driving force (2/3 base radius) which change occurs by reason of the variation in thickness of the sandwiched cone, the standing wave does not have the shape of a sine wave. In fact, such wave becomes considerably elongated in the zone of high velocity factor and contracted in the zone of low velocity factor. However, the shape of the wave can be computed quite easily and without significant error since the graph of the wave velocity factor, FIGURE 20, shows that such factor varies as a linear function of the distance $l$ taken from the circle of application of the driving force to the diaphragm. For distances included within the force ring and the base edge of the cone, the wave velocity factor is $$C = 238 \times 10^3 - (238 - 6) \times 10^3 x \quad (18)$$

for
$$0 \leq x \leq 1$$

where $x$ is the distance from the circle of application of the driving force.

Thus:

$$C = 238 \times 10^3 \left(1 - \frac{232}{238}x\right)$$

The differential relationship between distance, velocity and time is expressed as:

$$vdt = dx$$

$$dt = \frac{dx}{v} = \frac{dx}{238 \times 10^3 \left(1 - \frac{232}{238}x\right)} \quad (19)$$

and solving Equation 19 by integration yields, $$t_2 - t_1 = \Delta t = \int_{x_1}^{x_2} \frac{dx}{238 \times 10^3 \left(1 - \frac{232}{238}x\right)} \quad (20)$$

$$= \frac{1}{238 \times 10^3} \log \frac{\left(1 - \frac{232}{238}x_1\right)}{\left(1 - \frac{232}{238}x_2\right)} \quad (21)$$

This relationship makes it possible to determine exactly the shape of the standing wave in terms of the function of the reckoning distance $x_1$. For example, developing the amplitude of the wave at constant velocity we obtain:

$$A = A_0 \cos 2\pi \frac{x}{l}$$

as an expression of the wave amplitude in terms of the distance $x$. In this expression, the distance $x$ is related to time, $t$, and velocity, $v$, by, $x = vt$. However, as soon as the proportionality between time and distance does not exist, the time, $t$, must be evaluated in terms of the distance.

Considering the time intervals for the quarter wave taken as unity and any intermediate distance, we obtain the following relationship:

$$A = A_0 \cos \frac{\pi}{2} \times \frac{\log\left(\frac{238}{238 - 232x_1}\right)}{\log\left(\frac{238}{238 - 232x_2}\right)} = A_0 \cos \alpha \quad (22)$$

for $x_1 = nx_2$ and $x_2 = 1$ with $0 \leq n \leq 1$.

The wave shape factors are indicated in the following table for different distances $x$.

| x | .10 | .20 | .30 | .40 | .50 | .60 | .70 | .80 | .90 | .95 | 1.0 |
|---|---|---|---|---|---|---|---|---|---|---|---|
| log/log | .028 | .0532 | .034 | .1346 | .1815 | .238 | .312 | .412 | .5705 | .709 | 1.0 |
| α | 2°.55 | 5°.33 | 8°.5 | 12°.11 | 16°.35 | 21°.52 | 28°.1 | 37°.1 | 51°.4 | 63°.8 | 90° |
| A | .999 | .996 | .990 | .977 | .965 | .93 | .881 | .798 | .624 | .4435 | 0.0 |
| A' | .986 | .951 | .891 | .809 | .707 | .588 | .454 | .309 | .156 | .0788 | 0 |

In the above table, A' is the amplitude of the simple cosine wave.

From the values shown in the above table, it is seen that the wave shape is very much flattened leading to a greater coupling of the sound radiating surface to the sound transmitting medium. This is better exemplified by taking the mean average value of the wave over the entire surface, which mean average value can be expressed as:

$$A_{avg.} \cong A_0 \times 0.868$$

For a cosine standing wave the mean average value becomes:

$$A'_{avg.} \cong A_0 \times 0.637$$

and the ratio of the average amplitudes becomes, $$\frac{A_{avg.}}{A'_{avg.}} \cong \frac{0.868}{0.637} = 1.36$$

The effectiveness of the system toward maximum coupling of the vibrating cone becomes clear when the effective surface amplitude is computed. The radiating surface being circular, the incremental surface amplitude function is given by:

$$dS_A = A 2\pi R dR$$

in which the amplitude A is a function of the radius R, see FIGURE 21. The ratio of the surface amplitude integral between the flat wave form and the cosine wave is given by:

$$\frac{S_A}{S_{A'}} \cong 1.45$$

Of great interest is the shape of the standing wave corresponding to the second harmonic. The radial distance ($R_0 - 2/3 R_0$), see FIGURE 22, becomes the seat of the half wave with a nodal point located at such distance from the force ring, 0, that the time interval $t_1 - t_0$ and $t_2 - t_1$ are equal. Due to the variation of the wave velocity, these equal time intervals do not correspond to equal distances. In fact, the time interval $\Delta t$ corresponding to the distance $x_1 - x_0$ is given by:

$$\Delta t_{0-1} = t_1 - t_0 = \frac{1}{232 \times 10^3} \log \left[\frac{1 - \frac{232}{238}x_0}{1 - \frac{232}{238}x_1}\right] \quad (23)$$

and:

$$\Delta t_{1-2} = t_2 - t_1 = \frac{1}{232 \times 10^3} \log \left[\frac{1 - \frac{232}{238}x_1}{1 - \frac{232}{238}x_2}\right] \quad (24)$$

where $x_0 = 0$ and $x_2 = 1$.

By dividing and simplification, we obtain:

$$\left(1 - \frac{232}{238}\right)^{1/2} = 1 - \frac{232}{238}x_1 \quad (25)$$

or:

$$x_1 = \frac{238}{232}\left[1 - \left(1 - \frac{232}{238}\right)^{1/2}\right] = 0.864 \quad (26)$$

The quarter wave is in phase opposition in a narrow circular zone of $0.136 \times (R_0 - 2/3 R_0)$ width. Thus, the cancellation of radiated power by the out of phase component remains very small, whereas for a sine wave shape the cancellation by phase opposition would be quite complete.

It will be clear, then, that a conical diaphragm of the sandwiched type and having a cross section varying from a maximum thickness at the force ring to a minimum thickness at the apex and base offers noteworthy advantages, namely, (a) it raises the resonance frequency by a considerable amount, and (b) it makes the sound output cancellation by phase opposition extremely small.

By applying the driving force to the sandwiched cone by means of a circular force ring and coupling the drive coil to the cone by means of a circular ring member having a diameter substantially corresponding to that of the force ring, the diaphragm structure constitutes a structure of extreme rigidity. The wave velocity of such structure is very high and permits the development of standing waves of very high frequencies only. Also, the amplitude of such standing waves are considerably reduced, the amplitude being proportional to the distance from the circle at which the exciting force is applied to the cone. Further, the internal hysteresis inherent in the sandwiched material limits the resonance standing waves through the mechanism of kinetic energy dissipation.

Importantly, there exists still another desirable characteristic in the sandwiched construction herein disclosed. In effect, circular, standing waves require a specific condition for their appearance, that is, the circular wave velocity must be proportional to its distance from the center of the cone, or disc, diaphragm. All points along a radius must vibrate in phase as the diaphragm undergoes elastic deformation. If the elastic wave velocity does not follow an increase proportional to the radial distance, the different points along a given radius are no longer in phase and the standing wave cannot appear, or if it does appear, it becomes a modified wave of very high frequency (above of audible range) and leading to a honeycomb wave pattern of very small amplitude subject to complete damping by reason of the internal hysteresis of the diaphragm structure. The variable moment of inertia of the sandwiched cone structure decreases from the force ring toward the cone apex and base. Only a small zone of the sandwiched material can possibly be the seat of a circular standing wave of high frequency and the appearance of such wave is subject to severe limitations as imposed by the non-linear velocity wave function of the sandwiched cone having a varying cross-sectional thickness.

WEIGHT OF THE VIBRATORY SYSTEM

By reference to FIGURE 1, it will be apparent that the weight of the vibratory system is the sum of the individual weights of the conical diaphragm 24, the force ring 43, a portion of the spider 29, the coupling cylinder 23 and the drive coil 22.

The weight distribution of the sandwiched cone can be computed on the basis of unit length measured along the circle of the exciting force F, see FIGURES 23 and 24, which has a radius R equal to two thirds the base radius of the cone. For a one centimeter length, measured along a circle having the radius $R=2/3R_0$, the weight of the metal skins is expressed as:

$$W_s \cong \frac{9}{4} R_1 t_1 \delta_1 \times \frac{1}{\cos \alpha} \qquad (27)$$

where:
$t_1$ = the thickness of the foil skin,
$\delta_1$ = specific gravity of the material, and
$\alpha$ = angle formed by the side of the cone with respect to the plane of the cone base.

The weight of the filler material can be determined by means of the elementary volumes AA'BB'O and AA'BB'M'M using the unit length $$AA' = 1 \text{ cm.} = \frac{2}{3} \frac{R_0}{\cos \alpha} d\beta$$

and $AB = t_2$, see FIGURE 24.
The volume of the portion AA'BB'O is $$\frac{2}{9} t_2 \times \frac{R_0}{\cos \alpha}$$

whereas the volume of the portion AA'BB'MM is equal to:

$$\int_{\frac{2R_0}{3\cos\alpha}}^{\frac{R_0}{\cos\alpha}} \frac{9t_2}{2} \times \frac{\cos \alpha}{R_0} \left(1 - \frac{\cos \alpha}{R_0} R\right) R \, dR \qquad (28)$$

where:
$t_2$ = the distance AB or thickness at the face ring. Hence, the volume of the elementary filler section volumes becomes:

$$V_s = \frac{15}{36} t_2 \times \frac{R_0}{\cos \alpha} \qquad (29)$$

in cubic centimeter and the weight of such filler volume becomes, $$W_s = \frac{15}{36} \times \frac{R_0}{\cos \alpha} t_2 \delta_2 \qquad (30)$$

in grams, where $\delta$ is the specific gravity of the filler material.

Thus, the combined weight $W_c$, of the cone per 1 centimeter length measured on a circle of radius $R_1 = 2/3R_0$ becomes:

$$W_c = \frac{3}{2} \times \frac{R_0}{\cos \alpha} t_1 \delta_1 + \frac{15}{36} \frac{R_0}{\cos \alpha} t_2 \delta_2 \qquad (31)$$

$$= \frac{3R_0}{2 \cos \alpha} \left[ t_1 \delta_1 + \frac{5}{18} t_2 \delta_2 \right] \text{ grams} \qquad (32)$$

The following actual values represent a practical, sandwiched diaphragm for purposes of this invention:

Aluminum skins each having a thickness ($t_1$) of 0.02 cm. and a specific gravity ($\delta_1$) of 2.7;
Filler material having a specific gravity ($\delta_2$) of 0.02 and a thickness ($t_2$) of 1.0 cm.;
Cone base radius ($R_0$) 8″=20.32 cm.;
Cone apex angle equal to 120°, so that $\delta=30°$.

Inserting these values in Equation 32, the weight of the sandwiched diaphragm, per one (1.0) centimeter length taken along a circle having a radius of two thirds the cone base radius ($R_0$) is found to be 2.096 grams, such weight consisting of 1.90 grams for the aluminum skins and 0.1955 gram for the filler material. It will be noted that the filler material represents only slightly more than 10% of the total weight thereby permitting the use of a material having a higher specific gravity, if desired, without appreciably increasing the total weight.

The total weight of the diaphragm is obtained by multiplying the above value by $2\pi R_1 = 2\pi 2/3 R_0$, specifically:

$$2.096 \times 2\pi \times 2/3 \times 20.3 = 178 \text{ grams}$$

For comparison purposes, it is here pointed out that in the case of a conical diaphragm made of cardboard and having a base diameter of 16 inches and a cone angle of 120 degrees, good design requires a cone thickness of of 0.032″=0.08 cm. Assuming a specific gravity of 0.91 for the cardboard, the computed, total weight of such cone is 109 grams. The ratio of the weight of the two diaphragms is:

$$\frac{\text{sandwiched cone, 178 grams}}{\text{cardboard cone, 109 grams}} = 1.614$$

Thus, the many above-described advantages of my sandwiched cone are achieved with only a relatively small increase in weight over a conventional cone made of cardboard.

The cylindrical coupling ring 23 (see FIGURE 1), can be made of an aluminum tube of proper wall thickness or it can be formed of thin aluminum foil tightly wound with adjacent convolutions bonded together to form a mechanically rigid cylinder. In the latter case, the two ends of the foil can either be connected together or individually connected to an external resistor, all for the purpose of providing the required degree of damping for the vibratory system. The harmonic movement of a portion of the coupling ring in the magnetic flux field induces an electromotive force in the ring, resulting in the flow of an electric current which generates a force in-phase with the velocity and opposed to the displacement. I have found that a coupling ring made of a single, short-circuit turn of aluminum foil, having a thickness of 0.025 cm., will result in critical damping of the system for an air gap flux density of 8000 Maxwells per square centimeter. Such coupling ring will provide sufficient inherent resistance to buckling provided the axial length is not too long. In a practical sense, for a sixteen inch speaker, the coupling ring has a height of 3.0 cm. and a thickness of 0.025 cm. Aluminum having a specific gravity of 2.7, the weight of such coupling ring, for a one (1.0) centimeter length along the circle of radius 2/3R, is computed to be 0.187 gram.

The force ring 43, or harness, see FIGURE 1, is made of plastic material and its dimensions are governed primarily by the bond strength per unit surface area. In this respect, a bonding strength of the order of 522–2000 lbs. per square inch normally is achieved by modern methods using modern cements. I have found that the force ring having the dimensions shown in FIGURE 11 is adequate for the purpose. The computed weight of such force ring, for a one (1.0) centimeter length along a circle of radius $2/3R_0$ is 0.450 gram. Since the force ring moves precisely with the cone, its weight must be added to the weight of the vibratory system.

On the other hand, only a fraction of the spider veil moves in response to vibration of the system. Assuming that one-quarter of the spider veil constitutes a passive weight on the vibratory system and that the spokes in the spider constitute approximately one-half of the periphery, the spider weight is computed to be .030 gram, per centimeter length.

The drive coil weight is not passive but, rather, is strictly proportional to the force developed therein. The coil can safely carry a current of 5.0 amperes per square millimeter of conductor cross section. In the case of an aluminum wire drive coil having a thickness of 0.1 cm. and a height of 1.5 cm. the weight of the coil is computed to be 0.405 gram. The total R.M.S. current of the coil amounts to 75 amperes, which corresponds to a peak current of approximately 106 amperes.

The total weight of the movable system of my loud speaker per 1.0 centimeter length along the circle $2/3R_0$ loud speaker becomes:

|  | Grams |
|---|---|
| Sandwiched cone | 2.096 |
| Harness | 0.187 |
| Spider | 0.030 |
| Coupling cylinder | 0.450 |
| Drive coil | 0.405 |
|  | 3.168 |

The total movable weight of the system, as above computed, takes its real meaning when it is related to the driving force produced by the coil. Using a magnetic field intensity of $H=8000$ gauss, which is readily provided by my disclosed magnetic system, the driving force peak reaches the value of $$F = \frac{IHl}{10} = \frac{106 \times 8000}{10} = 84.8 \times 10^3 \text{ dynes} \quad (33)$$

or 86.4 grams per cm.

Applying the force to the corresponding total mass, in vacuum, and without restoring springs, yields a maximum possible vibration amplitude of:

$$A = \frac{F}{m\omega^2} = \frac{84.8 \times 10^3}{3.168 \times 4\pi^2 \nu^2} \quad (34)$$

$$= \frac{678}{\nu^2}$$

where $\nu$ is the frequency of the harmonic motion.

Such amplitude limit is never obtained in practice by reason of the load damping factor. Since the mechanical resonance frequency of the entire vibratory system must be very low, the spring rate of the system must be small. The spring rate K is given by the relationship:

$$K = 4\pi^2 m \nu_0^2$$

which, at a frequency of 10 cycles per second, becomes:

$$K = 12.5 \times 10^3 \text{ dynes/cm.}$$

By making the drive coil radius equal to two-thirds of the base radius of the cone-shaped diaphragm, the total force acting upon the diaphragm is far greater than in the case of conventional loud speakers wherein the drive coil is coupled to the diaphragm substantially at the apex of the cone. Specifically, for a 16 inch loud speaker, made in accordance with this invention, the total force $F_t$ acting upon the diaphragm is:

$$F_t = 84.8 \times 10^3 \times 2/3 \times 8 \times 2.54 \times 2\pi \quad (35)$$
$$= 7.2 \times 10^6 \text{ dynes}$$

or approximately 7.2 kilograms.

In a conventional loud speaker having a drive coil of 2 inch diameter, the total force $F_t'$ upon the diaphragm is, $$F_t' = 7.2 \times 10^6 \times \frac{1}{\frac{2 \times 8}{3}} = 1.35 \times 10^6 \text{ dynes}$$

or approximately 1.35 kilograms.

The force of 84.4 grams per centimeter of linear length along the cone would be excessive for cones of conventional construction and would result in a buckling of the diaphragm causing the appearance of the one-half subharmonic and multiples thereof. No such problem arises in a cone having a varying cross-sectional thickness as described herein.

Further, as has been described hereinabove, critical damping of the system readily is obtained by coupling the drive coil to the diaphragm by means of a one-turn, metallic coupling cylinder.

Additionally, the large radius of the drive coil provides for a high electrical impedance since this factor is proportional to the coil diameter.

It is also pointed out that, in my system, the ratio of the available drive force to the mass of the movable system is greater than that of conventional loud speaker constructions. In my system, this ratio is:

$$\frac{F}{M} = \frac{84.8 \times 10^3 \text{ dynes}}{3.168 \text{ grams}} = 26.8 \times 10^3 \text{ dynes/gram}$$

while for conventional systems this ratio is:

$$\frac{F}{M} = \frac{16 \times 10^3 \text{ dynes}}{1.61 \text{ grams}} = 10 \times 10^3 \text{ dynes/gram}$$

THE DRIVE COIL

The design parameters for the construction of a drive coil having very high efficiency will now be described. The drive coil comprises a plurality of turns of an electrical conductor operating in a magnetic flux field. A flow of current through the coil produces a force proportional to the product of the magnetic field flux density and the magnitude of the current. Since the current capacity of an electrical conductor generally is expressed as a current density per square millimeter (cross section of conductor) limited by the admissible temperature increase, it is convenient for design purposes to lump together the elementary current per conductor into a total current, I, which is equal to the product of the total effective conductor cross-sectional area and the admissible current density, $I_a$. Thus, if $a$ and $b$ are, respectively, the width and height of the multi-turn drive coil in centimeters, and $I_a$ is the current density per square centimeter dictated by the maximum operating temperature of the coil, the following relationship is valid:

$$I_e = I_a(ab) \quad (36)$$

the current $I_a$ representing the R.M.S. terms current density per square centimeter. Thus, the peak value of an A.-C. current becomes:

$$I = I_e\sqrt{2} = \sqrt{2}I_a(ab) \quad (37)$$
(peak)

In a practical sense, $I_a$ is of the order of 500 amperes per square centimeter, whereupon:

$$I = \sqrt{2} \times 500(ab) = 707(ab) \quad (38)$$
(peak)

which value represents the term of comparison for well designed movable coils.

Like any electrical motor, the drive coil is characterized by the developed force, the ohmic resistance of the coil, its weight, the force to weight factor and the heat dissipation limit which restricts the maximum power which can be delivered. Since resistance losses and their heat dissipation is the limiting factor, all relationships will be developed in terms of the lumped R.M.S. current $I_a$.

In terms of the R.M.S. current, the expression for the maximum force is:

$$F = \frac{\sqrt{2}I_a(ab)H}{10} \quad (39)$$

dynes per centimeter of coil length, where:

$I_a$=R.M.S. current in amperes/cm.$^2$,
$H$=field strength in gauss,
$(ab)$=cross sectional area of drive coil in cm.$^2$.

The total force applied to the diaphragm by the circular drive coil becomes, $$F_t = \frac{\sqrt{2}I_a(ab)H}{10} \times \left(2\pi\frac{2R_0}{3}\right) \text{ dynes} \qquad (40)$$

where $R_0$=the radius of the cone base in centimeters.

For a 16 inch diameter cone, $R_0$=2.54×8=20.32 cm. and assuming a cross-sectional coil area $(ab)$ of $$0.1 \times 1.5 \text{ cm.} = .15 \text{ cm.}^2$$

and a flux density, $H$, of 8000 gauss, the total force becomes:

$$F_t = 7.230 \times 10^6 \text{ dynes} = 7.36 \text{ kilograms}$$

If such total force is applied to the cone at the vicinity of the apex, the cone would buckle, but by applying such force to the cone along a circle at the radius $2/3R_0$ the loading is well within the limit of safe loading.

The total resistance of the coil is given by the relationship, $$r_t = \rho\frac{N^2}{(ab)} \times \left(2\pi\frac{2R_0}{3}\right) \text{ ohms.} \qquad (41)$$

where:

$\rho$ is the resistivity of the electrical conductor, in ohms/cm.$^2$,
$(ab)$ is the cross-sectional area of the coil in cm.$^2$,
$N$ is the number of conductors within the area $(ab)$, and
$R_0$ is the radius of the cone base in cm.

The total weight of the drive coil is given by the relationship:

$$W_t = \delta(ab)(2\pi 2/3R_0) \text{ grams} \qquad (42)$$

where $\delta$ is the specific gravity in gram/cm.$^2$.

The resistance losses of the coil represent the limiting factor to the power delivered when combined with the heat dissipation characteristics of the system. Thus, the resistance losses P become:

$$P = I_r^2 \text{ with } I = I_a\frac{(ab)}{N} \qquad (43)$$

$$= \rho I_a^2(ab) \text{ watts /cm.}$$

and the total resistance losses are given by:

$$P_t = \rho I_a^2(ab)(2\pi 2/3R) \text{ watts} \qquad (44)$$

In a vibratory system where the mass limits the excursion amplitude of the system, the choice of the electrical conductor is important. To that effect, and since the surface of the coil determines the heat dissipation capacity, we can obtain a relationship for different conductors by equating the expressions for heat dissipation, as follows:

$$P = \rho_1 \times I_{a1}^2(ab) = \rho_2 I_{a2}^2(ab) \qquad (45)$$

which yields:

$$\frac{I_{a1}}{I_{a2}} = \sqrt{\frac{\rho_2}{\rho_1}}$$

where, $\rho_1$ and $\rho_2$ are the resistivities of two conductors, say, aluminum and copper, respectively.

The peak forces produced, for an aluminum coil ($F_A$) and a copper ($F_C$) coil, each having the same number of turns are respectively expressed as:

$$F_A = \sqrt{2}\frac{I_{a1}(ab)H}{10}$$

and $$F_C = \sqrt{2}\frac{I_{a2}(ab)H}{10} \qquad (46)$$

while the weight of such coils becomes:

$$W_A = (ab)\delta_1$$

and $$W_C = (ab)\delta_2$$

The ratio of the force to weight, $u$, are then, respectively:

$$u_A = \frac{\sqrt{2}I_{a1}(ab)H}{10(ab)\delta_1}$$

and $$u_C = \frac{\sqrt{2}I_{a2}(ab)H}{10(ab)\delta_2} \qquad (47)$$

yielding:

$$u_A = \frac{I_{a1}}{I_{a2}} \times \frac{\delta_2}{\delta_1}u_C = \frac{\delta_2}{\delta_1}\sqrt{\frac{\rho_2}{\rho_1}}u_C$$

Inasmuch as copper has a resistivity ($\rho_2$) of $$1.7241 \times 10^{-6}$$

and a specific gravity ($\delta_2$) of 8.92; and aluminum has a resistivity ($\rho_1$) of 2.828×10$^{-6}$ and a specific gravity ($\delta_1$) of 2.7, then:

$$u_A = 2.57u_C$$

Thus, considering only the drive coil, it is apparent that aluminum conductors are preferred. However, the consideration must be given to the total mass of the vibratory system, that is, the cone, the spider, the force ring and the coupling cylinder. As computed above, the mass of these components is 3.061 grams, thus, the force to weight ratios becomes:

$$u_A' = \frac{\sqrt{2}I_{a1}(ab)H}{10[m+(ab)\delta_1]} \text{ and } u_C' = \frac{\sqrt{2}I_{a2}(ab)H}{10[m+(ab)\delta_2]} \qquad (48)$$

and with the mass ($m$) equal to 3.061 grams and the coil cross-sectional area $(ab)$ equal to 0.1×15 cm.=.15 cm.$^2$, $$u_A' = \frac{3.061+(.15)(8.92)}{3.061+(.15)(2.7)}\sqrt{\frac{1.7241}{2.828}} \qquad (49)$$

$$= \frac{4.398}{3.446} \times 0.78 = 099u_C'$$

In other words, when considering the total movable system and the specific coil dimension $(ab)$=.15 cm.$^2$, it makes but little difference if copper or aluminum conductors are used, the selection between the two metals being governed by economic factors and engineering problems. However, if the coil dimensions are made $(ab)$=.3 cm.$^2$, then:

$$u_A' = \frac{5.737}{3.871} \times .78 = 1.156u_C'$$

which dictates a coil of aluminum conductors.

The counter E.M.F. of the coil determines the design of the excitation circuit, the expression being, $$\epsilon = \frac{d\Phi}{dt} \times 10^{-8} \text{ volts} \qquad (50)$$

which, in the case of a movable cone, becomes:

$$\epsilon = HN \times 10^{-8} \times A_0\omega \sin(\omega_t - \varphi) \qquad (51)$$

per centimeter along a circle having a radius of two-thirds the cone base radius, where:

$A_0$=maximum amplitude of the cone harmonic motion, and
$\omega$=angular velocity of the cone displacement.

If we consider the maximum for $\epsilon$, $\sin(\omega_t-\varphi)$ becomes equal to one (1.0) and the total E.M.F. for the cone becomes:

$$\epsilon_t = HN \times 10^{-8} \times A_0\omega(2\pi 2/3R_0) \text{ volts} \qquad (52)$$

Naturally, $\epsilon_t$ depends upon the amplitude $A_0$ and the general behavior of the system may be generally described by the case where the cone undergoes displacements in vacuum, without elastic restoring forces, under the forces developed by the drive coil. This condition represents the upper limit very similar to the counter electromotive force developed in an electric motor with no load applied. The amplitude, $A_0$, in vacuum is given by the relationship, $$A_0 = \frac{F_t}{M\omega^2} = \frac{F}{m\omega^2} \qquad (53)$$

where:

$M$ = Total mass of the cone,
$F_t$ = Total force acting on the cone,
$F$ = Force acting per centimeter lengths measured on the circle of radius $2/3\ R_0$, and
$m$ = mass per centimeter length measured along the circle of radius $2/3R_0$.

Thus:

$$\epsilon_t = H^2 N \times 10^{-9} \frac{\sqrt{2} I_a(ab)}{m\omega} \times \left(2\pi \frac{2}{3} R\right) \text{ volts} \qquad (54)$$

Using the values:

$H = 8{,}000$ gauss  $\qquad N = 10$ turns
$I_a = 500$ amperes/cm.$^2$  $\qquad a = 0.1$ cm.
$\rho = 2.828 \times 10^{-6}$  $\qquad b = 1.5$ cm.
$m = 3.466$ grams  $\qquad R_0 = 20.3$ cm.

we obtain the following value, in vacuum, $$\epsilon_t = \frac{265}{\nu}$$

volts, where $\nu$ is the frequency in cycles per second.

For this particular set of values, the total resistance of the coil ($r_t$), the D.-C. voltage peak ($\Delta V_t$) and the total ohmic loss (P), become:

$$r_t = \rho \frac{N^2}{(ab)} \times \left(2\pi \frac{2}{3} R\right) = 0.1602 \text{ ohms}$$

$$\Delta V_t = r_t \times \frac{\sqrt{2} I_a(ab)}{N} = 1.703 \text{ volts (peak)}$$

$$= \rho N \sqrt{2} I_a \left(2\pi \frac{2}{3} R_0\right) = 1.205 \text{ volts (r.m.s.)}$$

$$\rho = \rho I_a^2 (ab) \left(2\pi \frac{2}{3} R_0\right) = 9 \text{ watts}$$

These results are difficult for matching with the power source which is of higher impedance. However, by maintaining the cross-sectional area of the coil constant $(ab) = 0.15$ cm.$^2$, we can change the coil dimensions to $a = 0.15$ cm., $b = 1.0$ cm. Also, the coil can be wound of aluminum foil having a thickness of 0.002 inch in which case the number of coil turns (N) becomes 30. In this case, the above parameters become:

$r_t = 1.44$ ohms
$\Delta V_t = 5.109$ volts
$P = 9$ watts $$\epsilon_t = \frac{795}{\nu} \text{ volts}$$

The ohmic resistance of the coil ($r_t$) still is low as is also the counter-electromotive force ($\epsilon_t$). Consequently, the coil can be made of aluminum foil ribbon having a thickness of about 0.001 with the bonding between turns secured by means of a mono-molecular layer of bonding cement. Such coil does not lose any of its mechanical rigidity and strength although the winding thereof requires a close control of the winding tension.

The volt-ampere characteristic of a drive coil offers a sound basis of comparison when established for a cone diaphragm vibrating in a vacuum without being acted on by a restoring force. This factor takes into account the mass of the complete vibratory system and represents the maximum possible power, only a percentage of which can be realized for sound production. The volt-ampere characteristic is equal to the product of the r.m.s. back electro-motive force multiplied by the r.m.s. current. Thus, we have, $$\epsilon_e = H^2 N \times 10^{-9} \frac{I_a(ab)}{m\omega} \times \left(2\pi \frac{2}{3} R_0\right) \text{ volts (r.m.s.)} \qquad (55)$$

$$I_e = I_a \frac{(ab)}{N}$$

yielding:

$$\epsilon_e I_e = \frac{H^2 I_a^2 (ab)^2 \times 10^{-9}}{m\omega} \times \left(2\pi \frac{2}{3} R\right) \qquad (56)$$

$$= \frac{2500}{\nu} \text{ volt amperes}$$

where:

$\nu$ = frequency of the harmonic force or of the A.C. current,
$a = 0.2$ cm.
$b = 1.0$ cm.
$I_a = 500$ amperes/cm.$^2$
$m = 3.47$ grams
$H = 8000$ gauss
$R_0 = 20.3$ cm.

PERFORMANCE OF THE TRANSDUCER

The structural features of the invention are here listed in summary:

(a) A cone diaphragm made of low density, expanded material sandwiched between and bonded to light metal skins that are prestressed in tension, resulting in a diaphragm of light weight and great structural strength.

(b) A sandwich type diaphragm having a varying cross-sectional thickness with a maximum thickness along a circle having a radius of two-thirds the cone radius, thereby adding to the strength of the cone along the circle of application of the drive force and eliminating standing waves.

(c) A drive coil having a radius equal substantially to two-thirds of the cone radius thereby developing a maximum drive force.

(d) A drive coil coupled to the diaphragm by an electrical-conducting cylinder which extends into the magnetic flux field thereby providing, effectively, critical damping of the system.

(e) A high energy, low leakage magnetic circuit with means for centering the magnetic components relative to each other and for centering the drive coil within the flux gap.

The computation of the actual performance characteristics of the transducer now follows. Reference is made to FIGURE 25, which is a diagrammatic representation of the electrical, mechanical and acoustic equivalents of the system. The electrical circuit includes the source of electromotive force E, the inductance of the circuit L, the ohmic resistance of the drive coil R and the drive coil $V_c$ which transforms the current into a mechanical force acting upon the diaphragm. The drive coil winding establishes the coupling between the electrical circuit and the mechano-acoustic system. The electrical circuit reacts into the mechanical circuit and the mechanical circuit reacts back on the electrical circuit by means of the counter-electromotive force $\epsilon$ set up in the drive coil as a consequence of its velocity. The electrical circuit also embodies the auxiliary winding formed by the coupling cylinder which, being closed upon itself through an adjustable resistor $r$, permits adjustment of system damping to a critical value.

The mechanical circuit comprises the piston or cone proper having a mass M and which is subjected to the forces of inertia $$M \frac{d^2 x}{dt^2}$$

the damping force $$D\frac{dx}{dt}$$

and the restoring force $K_x$. The piston, moving within and against an elastic medium, generates elastic waves propagating through the medium at the wave velocity characteristic of the medium. These elastic waves react upon the piston by means of acoustical pressure generally called radiation resistance and acoustical mass. While the acoustical mass is reactive in character, the radiation resistance is ohmic. Therefore, the mass of the piston must be considered as the sum of the mass proper plus the acoustical mass. The damping force factor D becomes the sum of the mechanical and electrical damping forces plus the radiation resistance factor. Thus, the dynamic equations of the system can be written directly and in a general form as:

$$L = \frac{dI}{dt} + RI + \epsilon = E \qquad (57)$$

$$M\frac{d^2x}{dt^2} + D\frac{dx}{dt} + Kx = FI \qquad (58)$$

where:
L is the total inductance of the circuit,
R is the ohmic resistance,
$\epsilon$ is the counter E.M.F.$=Hnl \times 10^{-8} dx/dt$ volts,
E is the impressed E.M.F.$=E_0 \sin \omega t$,
M is the total mechanical and acoustical mass,
D is the total electrical, mechanical and acoustical damping force factor,
K is the restoring force factor, or spring rate,
F is the motive force factor$=Hnl/10$,
I is the electric current intensity,
H is the magnetic flux density in the air gap,
n is the number of turns on the drive coil,
l is length of one turn of the drive coil,
x is the displacement of the cone or piston.

All of the above parameters are design factors governing the performance of the system. In general, the design of a loud speaker must meet two different requirements, namely, a maximum possible efficiency and fidelity of response. These two requirements are difficult of simultaneous achievement and, in general, fidelity cannot be secured without some sacrifice of overall efficiency because of the law governing the acoustical resistance variation.

The design of my novel loud speaker is directed to the achievement of maximum response fidelity. Indeed, the cone diaphragm has been designed to achieve a maximum freedom from resonance radial and circular standing waves and elastic deformation or buckling of the diaphragm. The drive coil has been designed to match the cone design to permit driving the cone diaphragm at the required circular zone corresponding to two-thirds of the cone radius and, at the same time, to provide an unusually large driving force factor. This large driving force factor eliminates the need to increase the radiated energy through resonance and higher order harmonics, as is required in conventional systems, which introduce considerable distortions and changes in tone quality.

In order to secure true fidelity of response, the mechanical resonance of the system must be outside of the audible range. It is advantageous to select a resonance frequency close to the lowest audible frequency in order to increase somewhat the radiated power at the very low frequencies. In the range of 20 to 150 cycles per second, the radiated energy remains relatively low since it would be difficult to construct a piston, or cone, of the required size.

True fidelity in the reproduction of music and speech cannot exist if the system does not reproduce transients and the precise rendition of transients necessitates a critically damped system.

Referring to FIGURE 26, if a transient in the form of:

$$I = I_0 e^{-gt} \sin \omega t$$

where $g$ is the decaying factor and $t$ the time duration, is impressed on a system the loud speaker undergoes a harmonic decaying oscillation which has very little similarity to the transient wave. This is best illustrated by solving the dynamic equation:

$$M\frac{d^2x}{dt^2} + D\frac{dx}{dt} + Kx = FI_0 e^{-gt} \sin \omega t \qquad (59)$$

With the initial condition that $x(0)=x'(0)=t=0$, the LaPlace transformation of Equation 59 becomes:

$$x(s) = \frac{f\omega}{(s^2+\rho s+\omega_0^2)[(s+g)^2+\omega^2]} \qquad (60)$$

with:

$$\rho = D/M$$
$$\omega_0^2 = K/M$$
$$f = FI_0/M$$

The solution of Equation 60 depends upon whether the polynomial in:

$$s^2 + \rho s + \omega_0^2$$

has imaginary or real roots. The roots are imaginary when the quantity $$\rho^2 - 4\omega_0^2 < 0$$

so that the solution of Equation 59 takes the complete form:

$$x = \frac{FI_0}{M} \times \frac{\omega}{\left[\omega_0^2 - \frac{\rho^2}{4}\right]^{1/2}} \times$$

$$\frac{e^{-\frac{\rho t}{2}} \sin\left[\left(\omega_0^2 - \frac{\rho^2}{4}\right)^{1/2} t - \phi\right]}{\left[\left[\left(g - \frac{\rho}{2}\right)^2 + \omega^2 - \omega_0^2 + \frac{\rho^2}{4}\right]^2 + 4\omega^2\left(\omega_0^2 - \frac{\rho^2}{4}\right)\left(g - \frac{\rho}{2}\right)^2\right]^{1/2}}$$

$$+ \frac{FI_0}{M} \times \frac{e^{-gt} \sin(\omega t - \psi)}{\left[\left[\left(g - \frac{\rho}{2}\right)^2 + \omega_0^2 - \omega^2 - \frac{\rho^2}{4}\right]^2 + 4\omega^2\left(g - \frac{\rho}{2}\right)^2\right]^{1/2}}$$

(61)

with $$\tan \varphi = \frac{2\left[\omega_0^2 - \frac{\rho^2}{4}\right]^{1/2}\left(g - \frac{\rho}{2}\right)}{\left(g - \frac{\rho}{2}\right)^2 + \omega^2 - \omega_0^2 + \frac{\rho^2}{4}} \qquad (62)$$

$$\tan \psi = \frac{-2\omega\left(g - \frac{\rho}{2}\right)}{\left(g - \frac{\rho}{2}\right)^2 + \omega_0^2 - \omega^2 - \frac{\rho^2}{4}} \qquad (63)$$

It will be noted that the two transient components amplitudes are damped harmonic oscillations. One of these, whose frequency is:

$$\omega^1 = \left[\omega_0^2 - \frac{\rho^2}{4}\right]^{1/2} \qquad (64)$$

is a parasitic oscillation without similarity to the transient to be reproduced. Also, the parasitic transient can correspond to the resonance frequency of the assembly or to any resonance frequency of elastic deformation of the cone.

There also exists another condition which plagues the conventional construction of a loud speaker which does not satisfy the condition of critical damping. Specifically, when the decay factor $g$ of the impressed transient becomes equal to half of the damping factor of the system, as:

$$g = \frac{\varphi}{2}$$

and when the equality:

$$\omega^2 = \omega_0^2 - \frac{\rho^2}{4}$$

is satisfied, the denominator becomes zero. Therefore, the transients, both impressed and parasitic, become grossly exaggerated producing a drumming sound which changes entirely the tone of the voice.

Naturally, those loud speakers which have an undamped resonance frequency corresponding to $\omega_0$ included within the audible range cannot provide a high fidelity of sound reproduction and, furthermore, the distortion is still more severe when the harmonic resonance frequencies of the cone diaphragm are not properly damped.

Contrarywise, if the condition of critical damping occurring for $\rho^2 - 4\omega_0^2 = 0$ is satisfied, then the behavior of the system is entirely different.

Solving Equation 59 for $\rho = 2\omega_0$ yields:

$$x = \frac{FI_0}{M} \times \frac{\omega e^{-\omega_0 t}}{[(\omega_0 - g)^2 + \omega^2]^2}[2\omega_0 - g) + [(\omega_0 - g)^2 + \omega^2]t]$$
$$+ \frac{FI_0}{M} \times \frac{e^{-gt} \sin(\omega t - \varphi)}{(\omega_0^2 - g)^2 + \omega^2} \quad (65)$$

with $$\tan \varphi = \frac{2\omega(\omega_0 - g)}{(\omega_0 - g)^2 + \omega^2}$$

The impressed transient cannot exite any parasitic harmonic transient while the system reproduces the impressed transient with fidelity. The reproduced transient amplitude, however, is inversely proportional to the square of its harmonic frequency but so is the amplitude of the steady state condition of any excited harmonic oscillation. By proper design the gain of the amplifier, which excites the drive coil, can be made to increase with frequency in order to compensate for such loss of amplitude. By this procedure, the incipient signal and the output radiated energy can be maintained at a constant ratio throughout the frequency spectrum.

The performance of my transducer system with respect to the acoustical radiated energy can be computed directly. For this purpose, we must evaluate the acoustical factors to be introduced into the general dynamic equation of the system.

The two acoustical factors governing the sound energy radiation, namely, the acoustical mass $M_a$ and the radiation resistance $D_a$, have been determined with a high degree of accuracy by Lord Rayleigh on the basis of a solid piston vibrating within an infinite baffle. These two factors, $M_a$ and $D_a$ are frequency dependent. As a matter of fact, the frequency spectrum must be divided into two parts to evaluate these particular factors. When the wave length $\lambda$, associated with the frequency, is larger than the length of the cone base circumference of radius "$a$," that is, for:

$\lambda > 2\pi a$, the radiation resistance $D_a$ is proportional to the square of the frequency. Within the same range of wave lengths larger than $2\pi a$, the acoustical mass remains constant.

When, however, the acoustical wave length $\lambda$ becomes equal to or smaller than half the cone base circumference, the radiation resistance remains constant (independent of frequency) while the acoustical mass decreases steadily toward zero.

For practical purposes of computation, the frequency spectrum can be divided into two zones separated from each other by the so-called critical frequency $\nu_c$. The value of the critical, or transition, frequency $\nu_c$ is given by the expression:

$$\nu_c = \frac{\sqrt{2}C}{2\pi a}$$

$$\lambda_c = \sqrt{2}\pi a$$

where:

$\nu_c$ is the critical frequency,
$\lambda_c$ is the critical wave length,
$C$ is the sound velocity of the medium, and
$a$ is the radius of the cone in centimeters.

The value of the acoustical mass $M_a$ which must be added to the piston mass for all frequencies below the critical frequency $\nu_c$, is given by:

$$M_a = \frac{8}{3}\rho_0 a^3 \text{grams} \quad (65)$$

in the c.g.s. system, and the value of the radiation resistance $D_a$ for the frequency band below the critical frequency has the value:

$$Da = \frac{1}{2}\frac{\pi \rho_0}{C}4\pi^2 a^4 \nu^2 \text{ dynes per cm./sec.} \quad (66)$$

where:

$\rho_0$ is the specific gravity of air $= 1.293 \times 10^3$ grams/ml.,
$C$ is the velocity of sound $= 3.30 \times 10^4$ cms./sec.,
$a$ is the radius of the cone in cms.,
$\nu$ is frequency in cycles per second.

Above the critical frequency $\nu_c$, the acoustical mass can be neglected and the radiation resistance becomes constant and independent of the frequency, whereby, $$D_{ac} = \frac{1}{2}\frac{\pi \rho_0}{C}4\pi^2 a^4 \nu_c^2 = \rho_0 C \pi a^2 \quad (67)$$

The sound energy radiation rate obtained directly from the finite integral:

$$W = \nu \int_0^T f dx = \nu \int_0^T fv dt \quad (68)$$

leads to the value:

$$W = \frac{1}{2D_a}\left|\frac{dx}{dt}\right|^2 \text{ ergs/seconds} \quad (69)$$

where:

$$\frac{dx}{dt}$$

is the maximum velocity of the piston.

Introducing the value $D_a$ as given by the Equation 67 we obtain:

$$W = \frac{\pi \rho_0}{4C}4\pi^2 a^4 \nu^2 \left|\frac{dx}{dt}\right|^2 \text{ ergs/second} \quad (70)$$

for $\nu < \nu_c$.

It will be noted that $\pi^2 a^4$ represents the square of the projected surface area of the cone hence a large cone diameter is imperative for two reasons. The radiated energy increases rapidly with an increase in radius "$a$" but, also, the critical frequency decreases when "$a$" increases thereby improving the rendition of low frequencies.

Above the critical frequency $\nu_c$ the radiated energy becomes:

$$W = \frac{\rho_0 C \pi a^2}{2}\left|\frac{dx}{dt}\right|^2 \text{ ergs/second} \quad (71)$$

Inasmuch as the displacement $x$ of the harmonic motion of the piston takes the form:

$$x = A \sin(\omega t - \varphi) \quad (72)$$

the maximum velocity becomes:

$$\frac{dx}{dt} = A\omega \cos(\omega t - \varphi)$$
$$= A 2\pi \nu \cos(\omega t - \varphi) \quad (73)$$

Thus, the radiated energies as given by Equations 70 and 71 can be written:

$$W^1 = \frac{4\pi^3 \rho_0}{C}\pi^2 a^4 \nu^4 A^2 \text{ ergs} \quad (74)$$

for $\nu<\nu_c$ and wherein A equals half the total amplitude of the harmonic motion, and $$W_h = 2\pi^2 \rho_0 C \pi a^2 \nu^2 A^2 \text{ergs} \tag{75}$$

for $\nu > \nu_c$.

The effective radiated energy is proportional to the square of the cone amplitude A. It is proportional to the surface area of the cone for frequencies above the critical frequency and proportional to the square of the surface area of the cone for frequencies below the critical frequency.

There is no definite rule for rating a loud speaker in terms of its radiating power. In fact, correct and true rendition of an orchestra involves many factors such as average sound energy level, peak sound levels, duration of the peaks, etc. However, it is logical to rate a loud speaker in terms of sustained radiated energy compatible with the heat loss dissipation capacity of the drive coil winding which must at least be equal to the ohmic losses of the coil. In so doing, the rating is directly related to measurable quantities, namely, the r.m.s. value of the sustained drive coil current and the temperature rise of the coil. Both of these quantities are independent of musical considerations. However, this method permits an evaluation of the peak radiation intensity in terms of its duration and frequency of occurrence whereby there is obtained the transfer of the steady state characteristics into musical rendition.

It is customary to consider a peak duration of 1/8 second occurring within intervals of 15 seconds of the average radiated power. The peak time interval added to the average sustained-level time integral must, at most, equal the time integral of the maximum steady state rating. Thus:

$$W_p \times 1/8 \text{ second} + W_{avg.} \times 15 \text{ seconds} \leq W_{sm} \times 15 \text{ seconds}$$

hence:

$$W_p = \frac{15}{1/8}(W_{sm} - W_{avg.}) = 120(W_{sm} - W_{avg.}) \tag{76}$$

where:
$W_p$ = peak energy for 1/8 second duration,
$W_{sm}$ = steady state maximum radiated energy,
$W_{avg.}$ = selected average radiation level.

The peak intensity is proportional to the difference between the steady state rating and the selected average energy level.

Nuances and contrasts can be achieved by lowering the average radiated energy. The limitation of the peak intensity is given by the peak loading current which produces frequency splitting through buckling of the cone. It is here pointed out that in a loud speaker of my design, the current intensity producing buckling of the cone is proportional to the product of the drive coil diameter multiplied by the moment of inertia of the cone structure at the circle of application of the drive force. The drive coil diameter equals two-thirds the cone base radius and the moment of inertia reaches a value which is approximately 468 times the moment of inertia found in conventional loud speaker designs. In conventional loud speakers, the cone buckles under a drive coil of some 0.6 amperes.

Rating loud speaker systems on the basis of admissible ohmic losses limited by the dissipation power of the drive coil leads to the specification of a maximum r.m.s. current I related to the peak current $I_p$ by:

$$I_p = \sqrt{2} I$$

This leads to the solution of the differential Equations 57 and 58 in steps, thus simplifying the problem. Indeed, it will suffice to solve the differential Equation 58 for a given peak current $I_p$, irrespective of frequency, and then equating this to Equation 57 which yields the required electromotive force to be applied to the drive coil.

Introducing the acoustical factors into the general differential Equation 58 defining the cone motion we obtain:

$$\left(M + \frac{8}{3}\rho_0 a^3\right)\frac{d^2x}{dt^2} + \left(D + \frac{1}{2}\frac{\pi\rho_0}{C}4\pi^2 a^4\nu^2\right)\frac{dx}{dt} + Kx = FI \tag{77}$$

for frequencies below the transition frequency, and:

$$M\frac{d^2x}{dt^2} + \left(D + \frac{1}{2}\frac{\pi\rho_0}{C}4\pi^2 a^4\nu^2\right)\frac{dx}{dt} + Kx = FI \tag{78}$$

for frequencies above the transition frequency $\nu_c$.

The passage from one set of factors corresponding to the frequencies below $\nu_c$ to the set of factors prevailing for the frequencies higher than $\nu_c$ is not as abrupt as indicated. There is a range of continuous transition. However, neglecting the transition range and using the two equations as written does not introduce appreciable error, particularly if the results are plotted in the form of curves which can easily be smoothed out.

For the purpose of solving Equations 77 and 78 these equations may be simplified in the following manner:

$$M'\frac{d^2x}{dt^2} + D'\frac{dx}{dt} + Kx = FI_p \sin \omega t \tag{79}$$

and:

$$\frac{D'}{M'} = \rho'; \quad \frac{K}{M'} = \omega_0^2; \quad f' = \frac{F}{M'}$$

Thus:

$$\frac{d^2x}{dt^2} + \rho'\frac{dx}{dt} + \omega_0^2 x + \omega_0^2 x = f' I_p \sin \omega t \tag{80}$$

Considering the steady state condition alone, we can specify the initial conditions as:

$$x(0) = x'(0) = t = 0 \tag{81}$$

in order to simplify the LaPlace transformation which is then:

$$x(s) = f' I_p \frac{\omega}{(s^2+\omega^2)(s^2+\rho's+\omega_0^2)} \tag{82}$$

or $$x(s) = f' I_p \left[\frac{A_s+B}{s^2+\omega^2} + \frac{C_s+D}{s^2+\rho's+\omega_0^2}\right] \tag{83}$$

Since the correct rendition of the transients imposes real roots for $s^2+\rho's+\omega_0^2$, as discussed hereinabove, we must have the condition wherein:

$$\rho' \leq 2\omega_0$$

where $\omega_0$ is the angular velocity of the resonance frequency of the mechanical assembly. This resonance frequency $\nu_0$ is selected at 15 cycles per second, that is, below the lowest audible frequency of 20 cycles per second or thereabout. This condition being satisfied, we can compute the coefficients A and B involved in the steady state condition. The factors C and D can be neglected because of the critical damping, since such factors give rise to two constants which are not subject to modulation. Thus:

$$A = -\frac{\omega \rho'}{(\omega_0^2 - \omega^2)^2 + \omega^2(\rho')^2} \tag{84}$$

$$B = \frac{\omega(\omega_0^2 - \omega^2)}{(\omega_0^2 - \omega^2)^2 + \omega^2(\rho')^2} \tag{85}$$

Upon introducing the constants A and B into the LaPlace transformation, Equation 82, and taking the inverse LaPlace transformation corresponding to the sustained state, we obtain the displacement:

$$x = f I_p \frac{\sin(\omega t - \varphi)}{[(\omega_0^2 - \omega^2)^2 + \omega^2(\rho')^2]^{1/2}} \tag{86}$$

with:

$$\tan \varphi = \frac{\omega \rho'}{\omega_0^2 - \omega^2}$$

in which:

$$f' = \frac{F}{M+M_a}; \quad \rho' = \frac{D+D_a}{M+M_a}; \quad \omega_0^2 = \frac{K}{M+M_a}$$

for frequencies below the critical frequency $\nu_c$.

When the computation is carried out for frequencies higher than the critical frequency $\nu_c$, then:

$$f' = \frac{F}{M}; \quad \rho' = \frac{D+D_{ac}}{M}; \quad \omega_0^2 = \frac{K}{M}$$

since $M_a$ becomes negligible with respect to $M$ and the radiation resistance becomes a constant equal to the radiation resistance $D_{ac}$ at the critical frequency $\nu_c$.

Having obtained the value of $X$ of the cone displacement amplitude, the maximum velocity $(dx/dt)_m$ of the motion is computed by derivation of $X$ as a function of time and entered into the Equations 70 and 71 yielding the radiated energies for frequencies below and above the critical frequency.

Therefore, for the frequencies lower than $\nu_c$, that is $\nu < \nu_c$, the radiated energy becomes:

$$W_a = \frac{D_a}{2}\left|\frac{dx}{dt}\right|^2_{max.}$$

$$= \left[\frac{FI_p}{M+M_a}\right]^2 \times \frac{4\pi\rho_0 a^4 \nu^4}{C\left[(\omega_0^2-\omega^2)^2 + \omega^2\left[\frac{D_m+d_a\nu^2}{M+M_a}\right]^2\right]} \quad (87)$$

It will be noted that:

$$d_a = \frac{D_a}{\nu^2} = \frac{2\pi\rho_0}{C}\pi^2 a^4$$

See Equation 66.

For the frequencies higher than the critical frequency, the radiated energy becomes:

$$W_a = \frac{D_{ac}}{2}\left|\frac{dx}{dt}\right|^2_{max.}$$

$$= \left(\frac{FI_p}{M}\right)^2 \frac{\rho_0 C\pi a^2 \times 4\pi^2\nu^2}{\left[2(\omega_0^2-\omega^2)^2 + \omega^2\left(\frac{D_m+\rho_0 C\pi a^2}{M}\right)^2\right]} \quad (88)$$

Since the force factor, $F$, entering into both Equations 87 and 88, is proportional to the flux density, $H$, in the air gap multiplied by the number of turns, $n$, of the coil and by the length, $l$, of one turn, that is:

$F = Hnl/10$ dynes per ampere, then, it follows that the radiated energy also is strictly proportional to the square of the flux density multiplied by the total conductor length product. Thus:

$$W_a = \frac{H^2 n^2 l^2}{100} I_p^2 \Phi(a, \nu) \quad (89)$$

It is important to bear in mind that the damping factor is made up of two quantities, namely, the radiation resistance $D_a$ and the mechanical damping force $D_m$, with the condition that the total damping will be at least critical at the resonance frequency of the system. In other words, the condition, $$\rho' = \frac{D_m+D_a}{M+M_a} \geq 2\omega_0 = 4\pi\nu_0 \quad (90)$$

must be satisfied.

At a resonance frequency of some 15 cycles per second, the radiation resistance $D_a$ would be far too small to provide, by itself, a condition of critical damping. Mechanical damping, $D_m$, must be added by means of the auxiliary coil formed by the metallic coupling cylinder which, in my device, couples the drive coil to the cone diaphragm. As a consequence, a certain amount of energy must be dissipated as ohmic losses to secure an exact reproduction of the transients even though the amount of such energy loss appears to be relatively high.

Equation 90, as derived from mathematical analysis, determines the amount of additional damping, $D_m$, either mechanical or electrical, which must be added, and this damping amounts to:

$$D_m \geq 2\omega_0(M+M_a) - D_a = 4\pi\nu_0(M+M_a) - D_{a0} \quad (91)$$

where, $D_{a0}$ is the radiation resistance computed for the resonance frequency $\nu_0$ of the system.

As an example, in the case of a cone-shaped diaphragm having a base diameter of 16 inches and a weight of 350 grams, the acoustical mass, $M_a$, represents some 35 grams while the radiation resistance, $D_{a0}$, at resonance frequency, excited at 15 cycles per seconds reaches the value of $D_{a0} = 119.3$ dynes per cm./sec. Therefore, the damping force, $D_m$, to be added, reaches the value:

$$D_m \geq 72518 - 119 = 72399 \text{ dynes per cm./sec.}$$

Evidently, at the frequency of 15 cycles per second the radiation resistance is but a small fraction of the damping resistance.

In conventional loud speaker systems, a relatively high resonance frequency is selected, usually in the neighborhood of 100–300 cycles per second. This procedure improves the sound output at those frequencies but at the cost of great distortion resulting from parasitic harmonics. The ability of the loud speaker to reproduce transients vanishes. If, in the conventional loud speaker design, the critical damping condition was respected, the amount of radiated energy in absolute value would decrease considerably, as indicated by Equations 87 and 88. Selecting a resonance frequency of 150 cycles per second, instead of 15 cycles per second, decreases the radiated energy absolute value by a factor of one one-hundredth (1/100).

The energy lost in damping alone represents a loss, the absolute value of which is given by:

$$W_d = \frac{D_m}{2}\left|\frac{dx}{dt}\right|^2$$

$$= \pi\nu_0\left[2(M+M_a) - \frac{\rho_0\pi^2 a^4}{C}\nu_0\right]\left[\frac{dx}{dt}\right]^2 \quad (92)$$

This loss decreases when the resonance frequency is increased, see Equation 87, but in a manner inversely proportional to the resonance frequency, while the useful radiated power decreases inversely as the square of resonance frequency.

For the frequency range below the critical frequency, $\nu_c$, the discussion can be computed by means of the expression yielding the efficiency $\epsilon_1$, of the system:

$$\epsilon_1 = \frac{W_a}{W_d+W_a} = \frac{D_a}{D_m+D_a}$$

$$= \frac{D_{a0}\nu^2}{4\pi\nu_0^3(M+M_a) + D_{a0}(\nu^2-\nu_0^2)} \quad (93)$$

and for frequencies above the critical frequency the efficiency $\epsilon_2$ becomes:

$$\epsilon_2 = \frac{W_{ac}}{W_d+W_{ac}} = \frac{D_{a0}\nu^2}{4\pi\nu_0^3(M+M_a) + D_{a0}(\nu^2c-\nu_0^2)} \quad (94)$$

The last two relationships contain and explain fully the reason for selecting a low resonance frequency for the system while the condition of critical damping must be satisfied to secure complete fidelity of response either in the steady state or transient state.

The pertinent design factors entering into the construction of a loud speaker made in accordance with this invention is given below:

Cone base radius, $a$, equals 8 inches = 20.32 cm.,
Effective total radiating radius, $a_a$, equals 8.5 inches = 21.6 cm.,
Mass of system, including drive coil, spider and coupling cylinder, $M$, equals 350 grams,
Radius of drive coil, $r$, equals 2/3 $a$ = 13.54 cm.,
Number of drive coil turns, $n$, equals 60 turns,
Length of winding turn, $l$, equals 85 cm.,
Electrical conductor width, $w$, equals 1.50 cm.,
Electrical conductor thickness, $t$, equals 0.0025 cm., Electrical conductor cross sectional area, S, equals 0.00375 sq. cm.,
Electrical drive current, I, equals $500 \times 0.000375 = 1.875$ amperes (R.M.S.),
Peak drive current, $I_p$, equals $\sqrt{2}I = 2.65$ amperes,
Coil resistance, R, equals 3.85 ohms,
Coil losses, $I^2R$, equals 13.5 watts,
Voltage drop across drive coil, V, equals $IR = 7.23$ volts (R.M.S.),
Peak voltage drop, $V_p$, equals $I_pR = 10.2$ volts,
Coil self inductance, L, equals $6.72 \times 10^{-3}$ henries,
Coil inductance at 400 ~, L, equals 16.88 ohms,
Coil total impedance, Z, equals $(R^2 + \omega^2 L^2)^{1/2}$ 17.3 ohms,
Magnetic flux density in air gap, H equals 8,000 Maxwells,
Driving force of coil, F, equals $nlIB/10 = 1.082 \times 10^7$ dynes,
Counter electromotive force, $e$, equals $nlb \times 10^{-8} = .408$ volt per cm. per sec.
Resonance frequency, $\nu_0$, equals 15 cycles per second,
Resonance angular velocity, $\omega_0$, equals 94.3 radians/sec.,
Cone transition, or critical frequency, $\nu_c$, equals $$\frac{C\sqrt{2}}{2\pi a_a} = 340 \text{ cycles per sec.}$$

Acoustical mass, $M_a$ equals $$\frac{8P_0 a_0^3}{3} = 34.8 \text{ grams}$$

Total mass, $M + M_a$, equals 380 grams,
Radiation resistance factor, $d_a$, equals $$\frac{2\pi^3 P_0 a^4}{C} = 0.53$$

Radiation resistance at transition frequency, $D_{ac}$, equals $0.53(340)^2 = 6.12 \times 10^4$,
Radiation resistance at resonance frequency, $D_{a0}$, equals $0.53(15)^2 = 1.193 \times 10^2$,
Resistance required for critical damping, $D_c$, equals $2\omega_0 M = 72,600$.

The transition frequency, $\nu_c$, divides the computations into two separate domains in which the coefficients of radiation and acoustical mass are entirely different. These domains are set forth in the following tabulation;

| $\nu$ | $\nu_0 = 15$ | $\nu_c = 340$ | | $\infty$ |
|---|---|---|---|---|
| $d_a$ | | 0.53 | | |
| $D_a$ | 119.3 | $6.12 \times 10^4$ | | $6.12 \times 10^4$ |
| $M_a$, grams | 35 | 35 | 0 | 0 |
| $M$ $M_a$, grams | 385 | 385 | 350 | 350 |
| $D_c$ | 72,600 dynes per cm./sec. | | | |

The following tabulation shows the results of a step-by-step computation of the radiated energy at different frequencies and under the steady state condition;

| Freq. $\nu$ | 20 | 30 | 100 | 243 | 340 |
|---|---|---|---|---|---|
| Radiated Power: | | | | | |
| In ergs | $2.16 \times 10^6$ | $3.36 \times 10^6$ | $5.005 \times 10^6$ | $5.15 \times 10^6$ | $5.19 \times 10^6$ |
| In watts | 0.216 | 0.336 | 0.50 | 0.515 | 0.519 |
| Relative Energy, db | −3.8 | −1.9 | −1.5 | 0 | 0 |

| Freq. $\nu$ | 1,000 | 2,000 | 4,000 | 10,000 | 15,000 |
|---|---|---|---|---|---|
| Radiated Power: | | | | | |
| In ergs | $.61 \times 10^6$ | $.15 \times 10^6$ | $3.84 \times 10^4$ | $6.12 \times 10^3$ | $2.72 \times 10^3$ |
| In watts | .061 | .015 | .00385 | .00061 | .000272 |
| Relative Energy, db | −9.3 | −15.4 | −21.3 | −29.3 | −32.8 |

Figure 27:
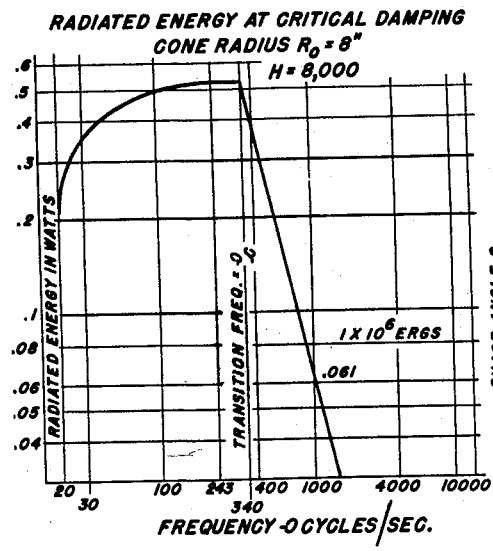
FIGURE 27 is a graph showing the radiated energy plotted against the frequency.
Figure 28:
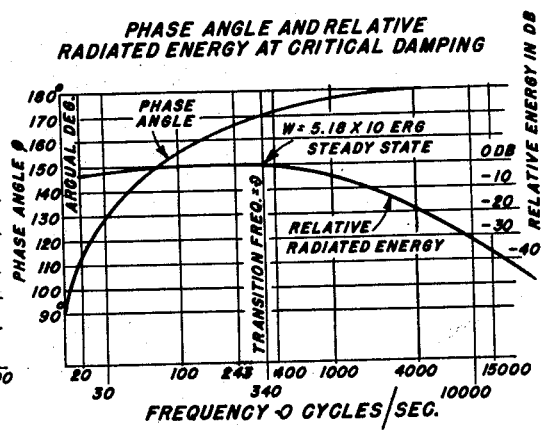
FIGURE 28 is a graph showing the radiated energy expressed in decibels and the relation of phase angle to frequency.
Figure 29:
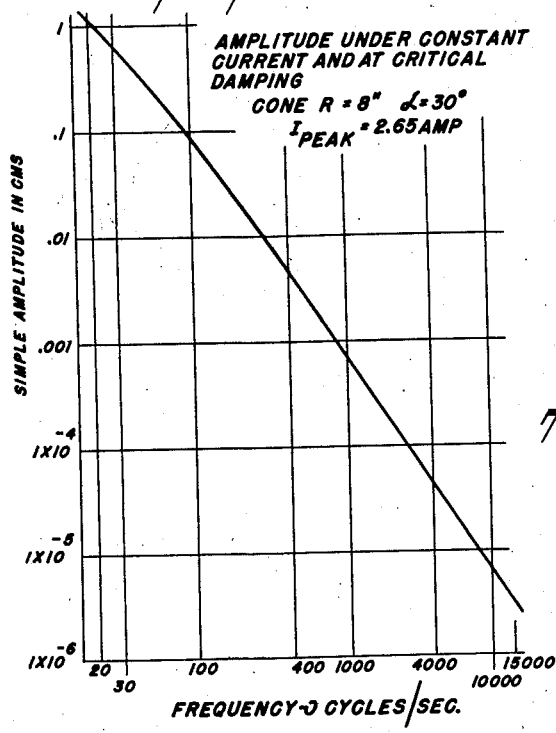
FIGURE 29 is a graph showing the displacement of the diaphragm with frequency.

The above results are plotted in graph form in FIGURE 27 which shows the variation of radiated energy with frequency; FIGURE 28, which shows the variation of the phase angle with frequency and the radiated energy expressed in decibels; and FIGURE 29, which shows the variation of the cone displacement amplitude with frequency.

It is important to note that the relative radiated energy remains fairly flat below the transition frequency of 340 cycles per second and falls off steadily at the rate of some six (6) decibels per octave, which rate can be compensated for directly by simply designing the amplifier so that it will provide a +6 db gain per octave.

From the above description, it will be apparent that a loud speaker made in accordance with this invention affords the following advantageous features:

(1) A practically flat response at frequencies below the transition frequency of 340 cycles per second. The loss of some 6 db per octave above 340 cycles per second readily is compensated for by appropriate amplifier design.

(2) A true reproduction of transients because of the critical damping, yet the speaker has a greater radiating power because of the large diameter of the drive coil.

(3) The transients cannot excite resonance harmonic frequencies because of the highly damped structure of the diaphragm and the attachment of the drive coil to the speaker at the two-thirds cone base radius. The latter prevents the existence of the first and second radial harmonic standing waves.

(4) A speaker which radiates large energies at the very high frequencies.

It may here be pointed out that the size of the loud speaker may be reduced if it is desired to favor the higher frequencies. A rather flat response curve over a wide range of frequencies can be obtained by selecting as the resonance frequency of the assembly one-half to one-fourth the critical, or transition frequency of the cone diaphragm.

Having now described my invention in detail, those skilled in this art will find no difficulty in making changes and modifications as required to meet desired operating or structural conditions. Such changes and variations may be made without departing from the scope and spirit of the invention as recited in the following claims.

I claim:

1. An electro-acoustic transducer comprising a generally-cylindrical frame open at each end; a magnetic structure carried at one end of the frame and forming a circular magnetic flux gap; a conical diaphragm having an outer end resiliently secured to the other end of the frame, said diaphragm having a cross-sectional thickness varying from minimum values at the apex and base to a maximum value along a circle having a radius in the range of 3/8 to 5/8 of the cone base radius; a spoke shaped resilient spider having an outer end fixed with respect to the frame and an inner end secured to the surface of the cone along the said circle; a coupling cylinder secured to the diaphragm along the said circle and extending into the flux gap; and a circular drive coil secured to the coupling cylinder and disposed in the flux gap.

2. The invention as recited in claim 1, wherein the said spider is formed of plastic material having a relatively thin, corrugated portion that terminates in a relatively thick, rigid inner end portion that is cemented to the diaphragm.

3. The invention as recited in claim 1, wherein the drive coil is formed of insulated aluminum foil.

4. The invention as recited in claim 1, wherein the said coupling cylinder is made of metal.

5. The invention as recited in claim 1, including a plurality of vibration dampers extending from the outer surface of the diaphragm.

6. The invention as recited in claim 1, wherein the diaphragm comprises metallic skins bonded to an intermediate member consisting of expanded, low-density material.

7. The invention as recited in claim 6, wherein the metallic skins are prestressed in tension.

8. The invention as recited in claim 1, wherein the said magnetic structure comprises an axially-magnetized ring magnet; a first soft-iron ring secured to one polar surface of the magnet, and a second soft-iron ring secured to the other polar surface of the magnet, said second soft-iron ring having an inner edge surface spaced from and aligned with the corresponding edge of the first soft-iron ring to form the magnetic flux gap.

9. A conical diaphragm for an electro-acoustic transducer comprising an inner member of low-density material and metallic skins bonded to each surface of the inner member, which metallic skins are pre-stressed in tension.

10. The invention as recited in claim 9, wherein the inner member has a non-uniform cross-sectional thickness varying from a minimum value at the base and apex to a maximum value along a circle having a radius substantially equal to two-thirds of the cone base radius.

11. The method of making a conical diaphragm which method comprises forming two substantially identical cones of metallic foil, placing an expansible, low-density material loaded with an expanding agent between the two cones, establishing predetermined initial spacings between the cone apexes and the cone bases and simultaneously expanding the material and bonding the metallic foils thereto while maintaining the said predetermined initial spacings.

12. An electro-acoustic transducer comprising means establishing a magnetic field across a circular gap, a circular drive coil operable in said gap, a conical diaphragm comprising a low density material having metallic skins bonded to the surfaces which skins are pre-stressed in tension, and means mechanically coupling the drive coil to the diaphragm.

13. The invention as recited in claim 12, wherein the thickness of the conical diaphragm varies from minimum values at the base and apex to a maximum value along a circle having a radius substantially equal to two-thirds of the cone base radius and wherein the drive coil is coupled to the diaphragm substantially along such circle.

14. The invention as recited in claim 13, wherein the drive coil has a radius corresponding substantially to that of the said circle and is coupled to the diaphragm by a closed metal ring.

15. The invention as recited in claim 13, wherein the drive coil has a radius corresponding substantially to that of the said circle and the means coupling the drive coil to the diaphragm comprises a closed metal ring, one end on the ring being connected to the diaphragm substantially along the said circle and the other end extending into the said gap and carrying the drive coil.

References Cited in the file of this patent

UNITED STATES PATENTS

| | | |
|---|---|---|
| 1,934,099 | Sollie | Nov. 7, 1933 |
| 1,969,256 | Clark et al. | Aug. 7, 1934 |
| 2,478,642 | Root | Aug. 9, 1949 |
| 2,534,157 | Zuerker | Dec. 12, 1950 |
| 2,549,139 | Stevens | Apr. 17, 1951 |
| 2,576,073 | Krapa et al. | Nov. 20, 1951 |
| 2,755,343 | Levy | July 17, 1956 |
| 2,769,942 | Hassan | Nov. 6, 1956 |
| 2,905,260 | Williams | Sept. 22, 1959 |
| 2,926,741 | Rohn et al. | Mar. 1, 1960 |
| 3,046,362 | White | July 24, 1962 |

FOREIGN PATENTS

| | | |
|---|---|---|
| 825,005 | France | Feb. 22, 1938 |
| 491,384 | Great Britain | Sept. 1, 1938 |
| 155,936 | Austria | Apr. 11, 1939 |
| 596,893 | Great Britain | Jan. 13, 1948 |
| 808,592 | Germany | July 16, 1951 |
| 900,228 | Germany | Dec. 21, 1953 |

OTHER REFERENCES

Barlow "Rigidity of Loudspeaker Diaphragms," Wireless World, vol. 64, No. 12, December 1958.

Hi-Fi Loudspeakers and Enclosures, Cohen, 1956 (page 104).